(12) United States Patent
LeTourneau

(10) Patent No.: US 9,646,107 B2
(45) Date of Patent: May 9, 2017

(54) METHOD AND/OR SYSTEM FOR SIMPLIFYING TREE EXPRESSIONS SUCH AS FOR QUERY REDUCTION

(75) Inventor: Jack J. LeTourneau, Ventura, CA (US)

(73) Assignee: Robert T. and Virginia T. Jenkins as Trustee of the Jenkins Family Trust, Sacramento, CA (US), Feb. 8, 2002

( * ) Notice: Subject to any disclaimer, the term of this patent is extended or adjusted under 35 U.S.C. 154(b) by 422 days.

(21) Appl. No.: 11/007,139

(22) Filed: Dec. 7, 2004

(65) Prior Publication Data

US 2005/0267908 A1    Dec. 1, 2005

Related U.S. Application Data

(60) Provisional application No. 60/575,784, filed on May 28, 2004.

(51) Int. Cl.
*G06F 17/30*    (2006.01)

(52) U.S. Cl.
CPC .. *G06F 17/30961* (2013.01); *G06F 17/30327* (2013.01); *G06F 17/30625* (2013.01)

(58) Field of Classification Search
CPC ............... G06F 17/30327; G06F 17/30625
USPC .................... 707/2–3, 100–101; 715/513
See application file for complete search history.

(56) References Cited

U.S. PATENT DOCUMENTS

| | | | |
|---|---|---|---|
| 3,201,701 A * | 8/1965 | Maitra | 326/11 |
| 3,704,345 A | 11/1972 | Coker | |
| 4,001,951 A | 1/1977 | Fasse | |
| 4,134,218 A | 1/1979 | Adams et al. | |
| 4,156,910 A | 5/1979 | Barton et al. | |
| 4,439,162 A | 3/1984 | Blaine | |
| 4,677,550 A | 6/1987 | Ferguson | |
| 4,737,109 A | 4/1988 | Abramson | |
| 4,745,561 A | 5/1988 | Hirosawa et al. | |
| 4,751,684 A | 6/1988 | Holt | |
| 4,831,525 A | 5/1989 | Saito et al. | |
| 4,867,686 A | 9/1989 | Goldstein | |
| 4,905,138 A | 2/1990 | Bourne | |
| 4,931,928 A | 6/1990 | Greenfeld | |
| 4,949,388 A | 8/1990 | Bhaskaran | |
| 4,989,132 A | 1/1991 | Mellender et al. | |
| 4,991,087 A | 2/1991 | Burkowski et al. | |
| 5,021,943 A | 6/1991 | Grimes | |
| 5,021,992 A | 6/1991 | Kondo | |
| 5,050,071 A | 9/1991 | Harris et al. | |
| 5,191,522 A | 3/1993 | Bosco et al. | |
| 5,235,701 A | 8/1993 | Ohler et al. | |
| 5,265,245 A | 11/1993 | Nordstrom et al. | |
| 5,295,261 A | 3/1994 | Simonetti | |
| 5,335,320 A | 8/1994 | Iwata | |
| 5,335,345 A | 8/1994 | Frieder et al. | |
| 5,355,469 A | 10/1994 | Sparks et al. | |
| 5,463,777 A * | 10/1995 | Bialkowski et al. | |
| 5,493,504 A * | 2/1996 | Minato | 716/106 |
| 5,497,500 A | 3/1996 | Rogers et al. | |
| 5,509,088 A | 4/1996 | Robson | |
| 5,519,627 A * | 5/1996 | Mahmood et al. | 716/103 |
| 5,522,068 A | 5/1996 | Berkowitz | |
| 5,577,253 A | 11/1996 | Blickstein | |
| 5,598,350 A | 1/1997 | Kawanishi et al. | |

(Continued)

OTHER PUBLICATIONS

Hoffmann et al., Pattern Matching in Trees, Jan. 1982, ACM Press, vol. 29, Issue 1, pp. 68-95.*

(Continued)

*Primary Examiner* — James Trujillo
*Assistant Examiner* — Jessica N Le
(74) *Attorney, Agent, or Firm* — Berkeley Law & Technology Group, LLP

(57) ABSTRACT

Embodiments of methods, apparatuses, devices and/or systems for simplifying tree expressions, such as for pattern matching, are disclosed.

56 Claims, 13 Drawing Sheets

(56) References Cited

U.S. PATENT DOCUMENTS

| | | | |
|---|---|---|---|
| 5,606,669 A | 2/1997 | Bertin et al. | |
| 5,636,155 A | 6/1997 | Kabuo | |
| 5,687,362 A * | 11/1997 | Bhargava et al. | |
| 5,706,406 A | 1/1998 | Pollock | |
| 5,724,512 A | 3/1998 | Winterbottom | |
| 5,724,576 A | 3/1998 | Letourneau | |
| 5,748,975 A | 5/1998 | Van De Vanter | |
| 5,758,152 A * | 5/1998 | LeTourneau | 707/102 |
| 5,778,371 A | 7/1998 | Fujihara | |
| 5,781,906 A | 7/1998 | Aggarwal et al. | |
| 5,787,415 A | 7/1998 | Jacobson et al. | |
| 5,787,432 A | 7/1998 | LeTourneau | |
| 5,796,356 A | 8/1998 | Okada et al. | |
| 5,802,370 A | 9/1998 | Sitbon et al. | |
| 5,822,593 A * | 10/1998 | Lamping et al. | 717/161 |
| 5,848,159 A | 12/1998 | Collins et al. | |
| 5,930,805 A | 7/1999 | Marquis | |
| 5,937,181 A | 8/1999 | Godefroid | |
| 5,970,490 A | 10/1999 | Morgenstern | |
| 5,978,789 A * | 11/1999 | Griffin | G06F 17/30471 |
| 5,978,790 A * | 11/1999 | Buneman et al. | |
| 5,999,926 A | 12/1999 | Suciu | |
| 6,002,879 A * | 12/1999 | Radigan et al. | 715/209 |
| 6,003,033 A | 12/1999 | Amano et al. | |
| 6,022,879 A * | 2/2000 | Crow et al. | 514/319 |
| 6,028,987 A | 2/2000 | Hirairi | |
| 6,055,537 A * | 4/2000 | LeTourneau | 707/101 |
| 6,076,087 A | 6/2000 | Suciu | |
| 6,088,691 A * | 7/2000 | Bhargava et al. | 707/714 |
| 6,141,655 A | 10/2000 | Johnson et al. | |
| 6,199,103 B1 | 3/2001 | Sakaguchi | |
| 6,236,410 B1 * | 5/2001 | Politis et al. | 345/440 |
| 6,243,859 B1 | 6/2001 | Chen-Kuang | |
| 6,289,354 B1 | 9/2001 | Aggarwal et al. | |
| 6,292,938 B1 | 9/2001 | Sarkar et al. | |
| 6,314,559 B1 | 11/2001 | Sollich | |
| 6,336,812 B1 | 1/2002 | Cooper et al. | |
| 6,341,372 B1 | 1/2002 | Datig | |
| 6,442,584 B1 | 8/2002 | Kolli et al. | |
| 6,446,256 B1 | 9/2002 | Hyman et al. | |
| 6,466,240 B1 | 10/2002 | Maslov | |
| 6,505,205 B1 | 1/2003 | Kothuri et al. | |
| 6,542,899 B1 | 4/2003 | Saulpaugh et al. | |
| 6,550,024 B1 * | 4/2003 | Pagurek et al. | 714/47 |
| 6,556,983 B1 | 4/2003 | Altschuler et al. | |
| 6,598,052 B1 | 7/2003 | Saulpaugh et al. | |
| 6,606,632 B1 | 8/2003 | Saulpaugh et al. | |
| 6,606,741 B2 | 8/2003 | Kojima et al. | |
| 6,609,130 B1 | 8/2003 | Saulpaugh et al. | |
| 6,611,844 B1 | 8/2003 | Saulpaugh et al. | |
| 6,658,649 B1 | 12/2003 | Bates et al. | |
| 6,714,939 B2 | 3/2004 | Saldanha et al. | |
| 6,745,384 B1 * | 6/2004 | Biggerstaff | 717/156 |
| 6,748,378 B1 | 6/2004 | Lavender et al. | |
| 6,763,515 B1 | 7/2004 | Vazquez et al. | |
| 6,785,673 B1 | 8/2004 | Fernandez et al. | |
| 6,817,865 B2 | 11/2004 | Charbonneau | |
| 6,829,695 B1 | 12/2004 | Ross | |
| 6,847,979 B2 | 1/2005 | Allemang et al. | |
| 6,854,976 B1 | 2/2005 | Suhr | |
| 6,874,005 B2 * | 3/2005 | Fortenberry et al. | 708/130 |
| 6,965,990 B2 | 11/2005 | Barsness et al. | |
| 6,968,330 B2 * | 11/2005 | Edwards et al. | 707/2 |
| 6,978,271 B1 | 12/2005 | Hoffman | |
| 7,043,555 B1 | 5/2006 | McClain et al. | |
| 7,051,033 B2 | 5/2006 | Agarwal et al. | |
| 7,072,904 B2 | 7/2006 | Najork et al. | |
| 7,103,838 B1 | 9/2006 | Krishnamurthy et al. | |
| 7,107,265 B1 | 9/2006 | Calvignac et al. | |
| 7,117,196 B2 | 10/2006 | Gaur et al. | |
| 7,117,479 B2 | 10/2006 | Van De Vanter | |
| 7,127,704 B2 | 10/2006 | Van De Vanter et al. | |
| 7,134,075 B2 | 11/2006 | Hind et al. | |
| 7,140,006 B2 * | 11/2006 | Harrison et al. | 717/152 |
| 7,162,485 B2 | 1/2007 | Gottlob et al. | |
| 7,191,182 B2 | 3/2007 | Anonsen et al. | |
| 7,203,680 B2 | 4/2007 | Parida | |
| 7,203,774 B1 | 4/2007 | Zhou et al. | |
| 7,287,026 B2 | 10/2007 | Oommen | |
| 7,313,563 B2 | 12/2007 | Bordawekar et al. | |
| 7,318,215 B1 | 1/2008 | Krishnan et al. | |
| 7,356,802 B2 | 4/2008 | de Sutter et al. | |
| 7,360,202 B1 | 4/2008 | Seshadri et al. | |
| 7,409,673 B2 | 8/2008 | Kuo et al. | |
| 7,419,376 B2 | 9/2008 | Sarvazyan et al. | |
| 7,437,666 B2 | 10/2008 | Ramarao | |
| 7,475,070 B2 | 1/2009 | Fan et al. | |
| 7,496,892 B2 | 2/2009 | Nuss | |
| 7,512,932 B2 | 3/2009 | Davidov et al. | |
| 7,536,675 B2 | 5/2009 | Gallagher | |
| 7,536,676 B2 | 5/2009 | Baker | |
| 7,544,062 B1 | 6/2009 | Hauschild et al. | |
| 7,561,927 B2 | 7/2009 | Oyama et al. | |
| 7,571,156 B1 | 8/2009 | Gupta et al. | |
| 7,571,169 B2 | 8/2009 | Jones et al. | |
| 7,574,692 B2 | 8/2009 | Herscu | |
| 7,575,434 B2 | 8/2009 | Palakodeti | |
| 7,620,632 B2 | 11/2009 | Andrews | |
| 7,627,591 B2 | 12/2009 | LeTourneau | |
| 7,630,995 B2 | 12/2009 | LeTourneau | |
| 7,636,727 B2 | 12/2009 | Schiffmann | |
| 7,650,592 B2 | 1/2010 | Eckels et al. | |
| 7,669,183 B2 | 2/2010 | Bowman et al. | |
| 7,681,177 B2 | 3/2010 | LeTourneau | |
| 7,761,847 B2 | 7/2010 | Kornerup et al. | |
| 7,761,858 B2 | 7/2010 | Chang et al. | |
| 7,765,183 B2 | 7/2010 | Williams, Jr. | |
| 7,779,396 B2 | 8/2010 | Meijer et al. | |
| 7,801,923 B2 | 9/2010 | LeTourneau | |
| 7,882,147 B2 | 2/2011 | LeTourneau | |
| 7,890,928 B2 | 2/2011 | Patrudu | |
| 7,899,821 B1 | 3/2011 | Schiffmann et al. | |
| 8,032,860 B2 | 10/2011 | Piehler et al. | |
| 8,037,102 B2 | 10/2011 | Letourneau | |
| 8,060,868 B2 | 11/2011 | Meijer et al. | |
| 8,112,740 B2 | 2/2012 | Meijer et al. | |
| 8,151,276 B2 | 4/2012 | Grechanik | |
| 8,181,155 B2 | 5/2012 | Pinto et al. | |
| 8,230,526 B2 | 7/2012 | Holland et al. | |
| 8,250,526 B2 | 8/2012 | Anderson et al. | |
| 8,316,059 B1 * | 11/2012 | Schiffmann | G06F 17/30327 707/797 |
| 8,356,040 B2 | 1/2013 | Letourneau | |
| 8,365,137 B2 | 1/2013 | Fant | |
| 8,438,534 B2 | 5/2013 | Thomson | |
| 8,443,339 B2 | 5/2013 | Letourneau | |
| 8,626,777 B2 | 1/2014 | LeTourneau | |
| 8,650,201 B2 | 2/2014 | LeTourneau | |
| 8,683,431 B2 | 3/2014 | Thomson et al. | |
| 8,762,942 B2 | 6/2014 | Langworthy et al. | |
| 9,002,862 B2 | 4/2015 | Schiffmann | |
| 9,020,961 B2 | 4/2015 | LeTourneau | |
| 9,043,347 B2 | 5/2015 | LeTourneau | |
| 9,077,515 B2 | 7/2015 | LeTourneau | |
| 9,330,128 B2 | 5/2016 | Schiffmann | |
| 9,411,841 B2 | 8/2016 | Schiffmann | |
| 9,425,951 B2 | 8/2016 | LeTourneau | |
| 2001/0003211 A1 * | 6/2001 | Bera | 717/4 |
| 2002/0040292 A1 | 4/2002 | Marcu | |
| 2002/0059281 A1 | 5/2002 | Watanabe et al. | |
| 2002/0062259 A1 | 5/2002 | Katz et al. | |
| 2002/0107860 A1 | 8/2002 | Gobeille et al. | |
| 2002/0129129 A1 | 9/2002 | Bloch et al. | |
| 2002/0130796 A1 | 9/2002 | Tsuchido et al. | |
| 2002/0133497 A1 * | 9/2002 | Draper | G06F 17/2205 |
| 2002/0149604 A1 | 10/2002 | Wilkinson | 345/643 |
| 2002/0169563 A1 * | 11/2002 | de Carvalho Ferreira | 702/20 |
| 2003/0041088 A1 | 2/2003 | Wilson et al. | |
| 2003/0065659 A1 | 4/2003 | Agarwal et al. | |
| 2003/0115559 A1 * | 6/2003 | Sawada | 716/5 |
| 2003/0130977 A1 | 7/2003 | Oommen | |
| 2003/0167445 A1 | 9/2003 | Su et al. | |
| 2003/0195885 A1 | 10/2003 | Emmick et al. | |
| 2003/0195890 A1 * | 10/2003 | Oommen | 707/100 |

(56) References Cited

U.S. PATENT DOCUMENTS

| | | | |
|---|---|---|---|
| 2003/0236794 A1 | 12/2003 | Hostetter et al. | |
| 2004/0010752 A1* | 1/2004 | Chan | G06F 17/30911 715/234 |
| 2004/0024790 A1 | 2/2004 | Everett | |
| 2004/0044659 A1 | 3/2004 | Judd et al. | |
| 2004/0054692 A1 | 3/2004 | Seyrat et al. | |
| 2004/0060007 A1 | 3/2004 | Gottlob et al. | |
| 2004/0068498 A1 | 4/2004 | Patchet et al. | |
| 2004/0103105 A1 | 5/2004 | Lindblad et al. | |
| 2004/0122844 A1 | 6/2004 | Malloy | |
| 2004/0148592 A1* | 7/2004 | Vion-Dury | G06F 8/437 717/152 |
| 2004/0205047 A1 | 10/2004 | Carpenter | |
| 2004/0215642 A1 | 10/2004 | Cameron et al. | |
| 2004/0239674 A1 | 12/2004 | Ewald et al. | |
| 2004/0254909 A1 | 12/2004 | Testa | |
| 2004/0260683 A1* | 12/2004 | Chan et al. | 707/3 |
| 2004/0260684 A1 | 12/2004 | Agrawal et al. | |
| 2004/0268236 A1 | 12/2004 | Chidlovskii et al. | |
| 2005/0010581 A1* | 1/2005 | Doan | G06F 17/272 |
| 2005/0021548 A1* | 1/2005 | Bohannon | G06F 17/30914 |
| 2005/0023524 A1 | 2/2005 | Beatty | |
| 2005/0027743 A1 | 2/2005 | O'Neil et al. | |
| 2005/0028091 A1 | 2/2005 | Bordawekar | |
| 2005/0050016 A1 | 3/2005 | Stanoi et al. | |
| 2005/0050066 A1 | 3/2005 | Hughes | |
| 2005/0058976 A1* | 3/2005 | Vernon | 434/322 |
| 2005/0060332 A1 | 3/2005 | Bernstein et al. | |
| 2005/0065964 A1 | 3/2005 | Ziemann et al. | |
| 2005/0125432 A1* | 6/2005 | Lin et al. | 707/101 |
| 2005/0138073 A1 | 6/2005 | Zhou et al. | |
| 2005/0154265 A1 | 7/2005 | Miro et al. | |
| 2005/0154979 A1 | 7/2005 | Chidlovskii et al. | |
| 2005/0156761 A1 | 7/2005 | Oh | |
| 2005/0165732 A1 | 7/2005 | Burges | |
| 2005/0187900 A1 | 8/2005 | LeTourneau | |
| 2005/0214727 A1 | 9/2005 | Stoianovici et al. | |
| 2005/0216445 A1 | 9/2005 | Rao | |
| 2005/0267908 A1 | 12/2005 | LeTourneau | |
| 2005/0286788 A1 | 12/2005 | Orr | |
| 2006/0004817 A1 | 1/2006 | Andrews | |
| 2006/0005122 A1 | 1/2006 | Lemoine | |
| 2006/0015538 A1 | 1/2006 | LeTourneau | |
| 2006/0053122 A1 | 3/2006 | Korn et al. | |
| 2006/0074838 A1 | 4/2006 | Srivastava | |
| 2006/0095442 A1 | 5/2006 | LeTourneau | |
| 2006/0095455 A1 | 5/2006 | LeTourneau | |
| 2006/0123029 A1 | 6/2006 | LeTourneau | |
| 2006/0129582 A1 | 6/2006 | Schiffmann | |
| 2006/0209351 A1 | 9/2006 | Saito | |
| 2006/0259533 A1 | 11/2006 | LeTourneau | |
| 2006/0271573 A1 | 11/2006 | LeTourneau | |
| 2007/0003917 A1 | 1/2007 | Kitching et al. | |
| 2007/0198538 A1* | 8/2007 | Palacios | 707/100 |
| 2010/0094885 A1 | 4/2010 | Andrews | |
| 2010/0094908 A1 | 4/2010 | Letourneau | |
| 2010/0114969 A1 | 5/2010 | Letourneau | |
| 2010/0191775 A1 | 7/2010 | Schiffmann et al. | |
| 2010/0205581 A1 | 8/2010 | LeTourneau | |
| 2012/0144388 A1 | 6/2012 | Schiffmann | |

OTHER PUBLICATIONS

Somani et al., Phased-Mission System Analysis Using Boolean Algebraic Methods, May 1994, ACM Press, vol. 22, Issue 1, pp. 98-107.*
"Core Technology Benchmarks a White Paper", Jul. 2002, downloaded from the internet Mar. 2, 2004.
"Origin Data, Inc. White Paper", pp. 1-13.
"The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
"The Associative Model of Data White Paper", Lazy Software, 2000.
Apostol, "A Centennial History of the Prime No. Theorem", Engineering and Science, No. 4, 1996.
Cano et al., "Lazy Evaluation in Penniless Propagation over Join Trees", Networks, vol. 39(4), 175-185, 2002.
Cooper et al., "Oh! Pascal!", 1982, pp. 295-327.
Er, M.C., "Enumerating Ordered Trees Lexicographically", Computation Journal, vol. 28, Issue 5, pp. 538-542, 1985.
Kharbutli et al., "Using Prime Numbers For Cache Indexing to Eliminate Conflict Misses", 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
LeTourneau, "The Elementary Theory of Object Oriented Arithmetic", pp. 1-9, Apr. 1990.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Sechrest et al., "Blending Hierarchical and Attribute-Based File Naming",Distributed Computing System, 1992, Proceedings of the 12th International Conference on Jun. 9-12, 1992, pp. 572-580.
Shanmugasundaram et al., "Querying SML Views of Relational Data", Proceedings of the 27th VLDB Conference, Roma, Italy, 2001.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) 2000.
Smorynski, Craig, "Logical No. Theory I: An Introduction", Springer-Verlag, 1991, pp, 14-23, and 305.
Stanat, D.F., and McAllister, D.F., "Discrete Mathematics in Computer Science", Prentice-Hall, 1977, Section 3.2, Trees, p. 131-145.
Valiente, "Algorithms on Trees and Graphs", pp. 151-251, Springer 2002.
Valiente, Gabriel, Chapter 4, "Tree Isomorphism," of Algorithms on Trees and Graphs, published by Springer, 2002.
Zaks, S., "Lexicographic Generation of Ordered Trees", The Journal of Theoretical Computer Science, vol. 10(1), pp. 63-82, 1980.
Office action: Restriction in co-pending U.S. Appl. No. 11/005,859, dated Dec. 12, 2007.
Response to Restriction Requirement in co-pending U.S. Appl. No. 11/005,859, dated Jan. 14, 2008.
Non-Final OA in U.S. Appl. No. 11/005,859, dated Mar. 21, 2008.
Office action: Restriction Requirement in co-pending U.S. Appl. No. 11/006,320 dated Mar. 26, 2007.
Response to Restriction Requirement in co-pending U.S. Appl. No. 11/006,320, dated Apr. 27, 2007.
Notice of Non-Compliant Amendment in co-pending U.S. Appl. No. 11/006,320, dated Jul. 6, 2007.
Response to Notice of Non-Compliant Amendment in co-pending U.S. Appl. No. 11/006,320, dated Jul. 25, 2007.
Non-Final OA issued in co-pending U.S. Appl. No. 11/006,320 dated Oct. 7, 2007
Response to Non-Final OA in co-pending U.S. Appl. No. 11/006,320 dated Jan. 29, 2008.
Notice of Non-Compliant Amendment in co-pending U.S. Appl. No. 11/006,320 dated Apr. 8, 2008.
Non-Final OA issued in co-pending U.S. Appl. No. 11/006,848 dated Apr. 4, 2007.
Response to Non-Final OA in co-pending U.S. Appl. No. 11/006,848, dated Oct. 3, 2007.
Supplemental Amendment in co-pending Application No. 11/006,848, dated Nov. 13, 2007.
Non-Final OA issued in co-pending U.S. Appl. No. 11/006,848, dated Feb. 5, 2008.
Non-Final OA issued in co-pending U.S. Appl. No. 11/006,841, dated Apr. 6, 2007.
Response to Non-Final OA in co-pending U.S. Appl. No. 11/006,841, dated Sep. 6, 2007.

(56) References Cited

OTHER PUBLICATIONS

Office Action: Restriction Requirement in co-pending U.S. Appl. No. 11/006,841, dates Nov. 27, 2007.
Response to Restriction Requirement in co-pending U.S. Appl. No. 11/006,841, dated Dec. 27, 2007.
Office Action: Restriction Requirement in co-pending U.S. Appl. No. 11/006,841, dated Mar. 17, 2008.
Preliminary Amendment in co-pending U.S. Appl. No. 11/006,440 dated Apr. 28, 2005.
Preliminary Amendment and Substitute Specification in co-pending U.S. Appl. No. 11/006,440 dated Oct. 5, 2006.
Office Action: Restriction Requirement in co-pending U.S. Appl. No. 11/006,440 dated Mar. 29, 2007.
Response to Restriction Requirement in co-pending U.S. Appl. No. 11/006,440 dated May 1, 2007.
Non-Final OA issued in co-pending U.S. Appl. No. 11/006,440 dated Jun. 21, 2007.
Response to Non-Final OA in co-pending U.S. Appl. No. 11/006,440 dated Nov. 20, 2007.
Final OA issued in co-pending U.S. Appl. No. 11/006,440 dated Feb. 6, 2008.
Response to Final OA in co-pending U.S. Appl. No. 11/006,440 dated Apr. 7, 2008.
Preliminary Amendment in co-pending U.S. Appl. No. 11/006,446, dated Apr. 28, 2005.
Office Action: Restriction Requirement in co-pending U.S. Appl. No. 11/006,446, dated Apr. 4, 2007.
Response to Restriction Requirement in co-pending U.S. Appl. No. 11/006,446, dated May 3, 2007.
Non-Final OA issued in co-pending U.S. Appl. No. 11/006,446, dated Jul. 26, 2007.
Response to Non-Final OA in co-pending U.S. Appl. No. 11/006,446, dated Nov. 26, 2007.
Non-Final OA issued in co-pending U.S. Appl. No. 11/006,446, dated Feb. 20, 2008.
Office Action: Restriction Requirement in co-pending U.S. Appl. No. 11/006,842, dated Jan. 23, 2008.
Response to Restriction Requirement in co-pending U.S. Appl. No. 11/006,842, dated Feb. 25, 2008.
Office Action: Restriction requirement in co-pending U.S. Appl. No. 11/412,417, dated Apr. 1, 2008.
Co-pending U.S. Appl. No. 11/319,758, filed Dec. 2005.
Co-pending U.S. Appl. No. 11/320,538, filed Dec. 2005.
Co-pending U.S. Appl. No. 11/480,094, filed Jun. 2006.
Non-Final OA issued in co-pending U.S. Appl. No. 11/385,257, dated Apr. 29, 2008.
Response to Notice of Non-Compliant Amendment in co-pending U.S. Appl. No. 11/006,320 dated May 5, 2008.
Advisory Action issued in co-pending U.S. Appl. No. 11/006,440 dated May 9, 2008.
Preliminary Amendment in co-pending U.S. Appl. No. 11/005,859, dated May 2, 2005.
Preliminary Amendment in co-pending U.S. Appl. No. 11/006,320 dated May 9, 2005.
Preliminary Amendment in co-pending U.S. Appl. No. 11/006,848, dated May 3, 2005.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Google Search (Kleene prime enumeration operation) conducted by Examiner on Jul. 18, 2009, 2 pages.
Google search (Kleene prime enumeration operation natural numerals sequences "Kleene prime") conducted by Examiner on Jul. 18, 2009, 2 pages.
Google Search (Kleene prime enumeration operation natural numerals sequences "enumeration operation") conducted by Examiner on Jul. 18, 2009, 2 pages.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Wu, "A Prime Number Labeling Scheme for Dynamic Ordered XML Trees", IEEE, 2004, 13 pages.
Response filed Jul. 21, 2008 in co-pending U.S. Appl. No. 11/005,859, 86 pages.
Final Office Action mailed Oct. 30, 2008 in co-pending U.S. Appl. No. 11/005,859, 14 pages.
Response filed Dec. 30, 2008 in co-pending U.S. Appl. No. 11/005,859, 82 pages.
Advisory Action mailed Jan. 13, 2009 in co-pending U.S. Appl. No. 11/005,859, 3 pages.
RCE and Amendment filed Apr. 30, 2009 in co-pending U.S. Appl. No. 11/005,859, 86 pages.
Final Office action mailed Jul. 8, 2009 in co-pending U.S. Appl. No. 11/005,859, 8 pages.
Non-Final OA mailed Aug. 15, 2008 in co-pending U.S. Appl. No. 11/006,320, 19 pages.
Response to Non-Final OA filed 11/14/08 in co-pending U.S. Appl. No. 11/006,320, 37 pages.
Notice of Non-Compliant Amendment mailed Jan. 27, 2009 in co-pending U.S. Appl. No. 11/006,320, 2 pages.
Amendment filed Apr. 27, 2009 in co-pending U.S. Appl. No. 11/006,320, 39 pages.
Final Office action mailed Jul. 29, 2009 in co-pending U.S. Appl. No. 11/006,320, 7 pages.
Response filed Aug. 4, 2008 in co-pending U.S. Appl. No. 11/006,848, 27 pages.
Final Office action mailed Dec. 2, 2008 in co-pending U.S. Appl. No. 11/006,848, 30 pages.
RCE and Amendment filed May 4, 2009 in co-pending U.S. Appl. No. 11/006,848, 24 pages.
Notice of Allowance mailed Jun. 11, 2009 in co-pending U.S. Appl. No. 11/006,848, 8 pages.
Issue Fee filed Sep. 11, 2009 in co-pending U.S. Appl. No. 11/006,848, 10 pages.
Response to Restriction Requirement filed Jul. 17, 2008 in co-pending U.S. Appl. No. 11/006,841, 33 pages.
Final Office Action, mailed Oct. 29, 2008 in co-pending U.S. Appl. No. 11/006,841, 54 pages.
Response filed Dec. 29, 2008 in co-pending U.S. Appl. No. 11/006,841, 45 pages.
Advisory Action mailed Jan. 6, 2009 in co-pending U.S. Appl. No. 11/006,841, 3 pages.
RCE and Amendment filed Apr. 23, 2009 in co-pending U.S. Appl. No. 11/006,841, 48 pages.
Supplemental Response files Jun. 26, 2009 in co-pending U.S. Appl. No. 11/006,841, 34 pages.
Notice of Allowance mailed Jun. 29, 2009 in co-pending U.S. Appl. No. 11/006,841, 40 pages.
Issue Fee filed Sep. 29, 2009 in co-pending U.S. Appl. No. 11/006,841, 4 pages.
Notice of Appeal filed Aug. 4, 2008 in co-pending U.S. Appl. No. 11/006,440, 1 page.
Final Office action mailed Jan. 23, 2009 in co-pending U.S. Appl. No. 11/006,440, 22 pages.
RCE and Amendment filed Nov. 4, 2008 in co-pending U.S. Appl. No. 11/006,440, 39 pages.
Amendment After Final filed Apr. 23, 2009 in co-pending U.S. Appl. No. 11/006,440, 34 pages.
Supplemental Amendment filed Jul. 17, 2009 in co-pending U.S. Appl. No. 11/006,440, 29 pages.

(56) References Cited

OTHER PUBLICATIONS

Notice of Allowance mailed Jul. 31, 2009 in co-pending U.S. Appl. No. 11/006,440, 15 pages.
Examiner's Amendment and Reasons for Allowance mailed Sep. 3, 2009 in co-pending U.S. Appl. No. 11/006,440, 9 pages.
Response filed Jul. 21, 2008 in co-pending U.S. Appl. No. 11/006,446, 29 pages.
Final Office action mailed Oct. 28, 2008 in co-pending U.S. Appl. No. 11/006,446, 40 pages.
Response filed Dec. 29, 2008 in co-pending U.S. Appl. No. 11/006,446, 30 pages.
Advisory action mailed Jan. 7, 2009 in co-pending U.S. Appl. No. 11/006,446, 3 pages.
RCE and Amendment filed Apr. 28, 2009 in co-pending U.S. Appl. No. 11/006,446, 33 pages.
Office action mailed Jul. 7, 2009 in co-pending U.S. Appl. No. 11/006,446, 32 pages.
Amendment filed Jul. 29, 2008 in co-pending U.S. Appl. No. 11/385,257, 26 pages.
Final Office action mailed Dec. 9, 2008 in co-pending U.S. Appl. No. 11/385,257, 35 pages.
RCE and Amendment filed May 11, 2009 in co-pending U.S. Appl. No. 11/385,257, 33 pages.
Supplemental Response filed May 26, 2009 in co-pending U.S. Appl. No. 11/385,257, 3 pages.
Notice of Non-Compliant Amendment mailed Jun. 1, 2009 in co-pending U.S. Appl. No. 11/385,257, 3 pages.
Response filed Jun. 30, 2009 in co-pending U.S. Appl. No. 11/385,257, 31 pages.
Office action mailed Sep. 14, 2009 in co-pending U.S. Appl. No. 11/385,257, 37 pages.
Office action mailed Nov. 12, 2008 in co-pending U.S. Appl. No. 11/319,758, 30 pages.
Amendment filed May 12, 2009 in co-pending U.S. Appl. No. 11/319,758, 35 pages.
Final Office action mailed Aug. 3, 2009 in co-pending U.S. Appl. No. 11/319,758, 35 pages.
Office action: Restriction Requirement mailed May 13, 2008 in co-pending U.S. Appl. No.11/006,842, 5 pages.
Response to Restriction Requirement filed Aug. 31, 2008 in co-pending U.S. Appl. No. 11/006,842, 24 pages.
Office action mailed Nov. 3, 2008 in co-pending U.S. Appl. No. 11/006,842, 21 pages.
Response filed May 4, 2009 in co-pending U.S. Appl. No. 11/006,842, 5 pages.
Supplemental Response filed Jul. 17, 2009 in co-pending U.S. Appl. No. 11/006,842, 23 pages.
Notice of Allowance mailed Jul. 27, 2009 in co-pending U.S. Appl. No. 11/006,842, 13 pages.
Office action mailed Apr. 1, 2009 in co-pending U.S. Appl. No. 11/320,538, 18 pages.
Response filed Jul. 1, 2009 in co-pending U.S. Appl. No. 11/320,538, 26 pages.
Office action mailed May 27, 2009 in co-pending U.S. Appl. No. 11/361,500, 24 pages.
Response filed Aug. 27, 2009 in co-pending U.S. Appl. No. 11/361,500, 36 pages.
Amendment filed Aug. 1, 2008 in co-pending U.S. Appl. No. 11/412,417, 27 pages.
Final Office action mailed Nov. 13, 2008 in co-pending U.S. Appl. No. 11/412,417, 34 pages.
RCE and Amendment filed May 12, 2009 in co-pending U.S. Appl. No. 11/412,417, 31 pages.
Office action mailed Jun. 30, 2009 in co-pending U.S. Appl. No. 11/412,417, 34 pages.
Office action mailed Nov. 7, 2008 in co-pending U.S. Appl. No. 11/480,094, 19 pages.
Amendment filed May 7, 2009 in co-pending U.S. Appl. No. 11/480,094, 33 pages.
Final Office action mailed Jul. 28, 2009 in co-pending U.S. Appl. No. 11/480,094, 12 pages.
Johnston et al. Advances in Dataflow Programming Languages, *ACM Computing Surveys*, vol. 36, No. 1, pp. 1-34, 2004.
Navarro, "A Guided Tour to Approximate String Matching", *ACM Computing Surveys*, vol. 33, No. 1, pp. 31-88, 2001.
Reiss, "Semantics-Based Code Search", *IEEE ICSE*, pp. 243-253, 2009.
Talukdar, "Learning to Create Data-Integrating Queries", *ACM PVLDB*, pp. 785-796, 2008.
Examiner's Interview Summary mailed. Oct. 27, 2009 in U.S. Appl. No. 11/005,859, 3 pages.
Amendment After Final filed Dec. 8, 2009 in U.S. Appl. No. 11/005,859, 87pages.
Amendment After Final filed Nov. 30, 2009 in U.S. Appl. No. 11/006,320, 8 pages.
Office action mailed Dec. 4, 2009 in U.S. Appl. No. 11/006,320, 13 pages.
Issue Motification mailed Oct. 28, 2009 in U.S. Appl. No. 11/006,848, 1 page.
Patent Application filed, Oct. 5, 2009 in co-pending U.S. Appl. No. 12/573,829, 59 pages.
Preliminary Amendment filed Dec. 21, 2009 in co-pending U.S. Appl. No. 12/573,829, 19 pages.
Letter re IDS considered by Examiner mailed Oct. 21, 2009 in Patent Application No. 11/006,841, 5 pages.
Issue Notification mailed Nov. 11, 2009 in U.S. Appl. No. 11/006,841, 1 page.
Patent Application filed Oct. 13, 2009 in co-pending U.S. Appl. No. 12/578,411, 65 pages.
Letter re IDS considered by Examiner mailed Oct. 21, 2009 in U.S. Appl. No. 11/006,440, 5 pages.
Issue Fee filed Nov. 2, 2009 in U.S. Appl. No. 11/006,440, 12 pages.
Notice of Non-Compliant IDS mailed Nov. 12, 2009 in U.S. Appl. No. 11/006,440, 1 page.
Issue Notification mailed Dec. 2, 2009 in U.S. Appl. No. 11/006,440, 1 page.
Patent Application and Preliminary Amendment filed Nov. 30, 2009 in co-pending U.S. Appl. No. 12/627,816, 86 pages.
Examiner's Interview Summary mailed Oct. 26, 2009 in U.S. Appl. No. 11/006,446, 4 pages.
Response filed Dec. 7, 2009 in U.S. Appl. No. 11/006,446, 30 pages.
Letter re IDS considered by Examiner mailed Oct. 22, 2009 inU.S. Appl. No. 11/006,842, 4 page.
Issue Fee filed Oct. 27, 2009 in U.S. Appl. No. 11/006,842, 1 page.
Notice of Non-Compliant IDS mailed Nov. 3, 2009 in U.S. Appl. No. 11/006,842, 1 page.
Patenet Application filed Nov. 5, 2009 in co-pending U.S. Appl. No. 12/613,450, 55 pages.
Final Office action mailed Nov. 2, 2009 in U.S. Appl. No. 11/320,538, 20 pages.
Notice of Allowance mailed Dec. 11, 2009 in U.S. Appl. No. 11/361,500, 14 pages.
Examiner's Interview Summary mailed Oct. 30, 2009 in U.S. Appl. No. 11/412,417, 3 pages.
Response filed Oct. 30, 2009 in U.S. Appl. No. 11/412,417, 30 pages.
Request for Continued Examination and Amendment filed Dec. 28, 2009 in U.S. Appl. No. 11/480,094, 36 pages.
Advisory Action mailed Dec. 22, 2009 in U.S. Appl. No. 11/005,859, 2 pages.
U.S. Appl. No. 12/830,236 / Divisional Application filed Jul. 2, 2010, 103 pages.
U.S. Appl. No. 11/385,257 / Response to Non-Final Office Action filed Jan. 13, 2010, 34 pages.
U.S. Appl. No. 11/385,257 / Final Office Action mailed Apr. 12, 2010, 47 pages.
U.S. Appl. No. 11/319,758 / RCE filed Jan. 4, 2010, 45 pages.
U.S. Appl. No. 11/319,758 / Non-Final Office Action mailed Mar. 30, 2010, 39 pages.
U.S. Appl. No. 12/613,450 / Notice of Missing Parts mailed Nov. 18, 2009, 2 pages.

(56) References Cited

OTHER PUBLICATIONS

U.S. Appl. No. 12/613,450 / Preliminary Amendment and Response to Missing Parts filed Jan. 19, 2010, 16 pages.
U.S. Appl. No. 11/320,538 / Response to Final Office Action filed Jan. 4, 2010, 23 pages.
U.S. Appl. No. 11/320,538 / Advisory Action mailed Jan. 19, 2010, 3 pages.
U.S. Appl. No. 11/320,538 / RCE and Amendment filed Apr. 2, 2010, 26 pages.
U.S. Appl. No. 11/320,538 / Non-Final Office Action mailed Jun. 9, 2010, 24 pages.
U.S. Appl. No. 12/702,243 / Continuation Application with Preliminary Amendment filed Feb. 8, 2010, 83 pages.
U.S. Appl. No. 12/702,243 / Notice of Missing Parts mailed Feb. 25, 2010, 2 pages.
U.S. Appl. No. 12/702,243 / Response to Missing Parts filed Apr. 26, 2010, 8 pages.
U.S. Appl. No. 11/412,417 / Final Office Action mailed Jan. 4, 2010, 37 pages.
U.S. Appl. No. 11/412,417 / RCE with Amendment filed May 4, 2010, 27 pages.
U.S. Appl. No. 11/005,859, Advisory Action mailed Dec. 22, 2009, 2 pages.
U.S. Appl. No. 11/005,859, RCE with Amendment filed Jan. 7, 2010, 87 pages.
U.S. Appl. No. 11/005,859 / Non-Final Office Action mailed Jan. 21, 2010 17 pages.
U.S. Appl. No. 11/005,859 / Response to Non-Final Office Action filed Feb. 25, 2010, 85 pages.
U.S. Appl. No. 11/005,859 / Final Office Action mailed Jun. 8, 2010, 9 pages,
U.S. Appl. No. 11/006,320 / Response to Non-Final Office Action filed Feb. 23, 2010, 11 pages.
U.S. Appl. No. 11/006,320 / Final Office Action mailed May 24, 2010, 11 pages.
U.S. Appl. No. 12/573,829 / Notice of Publication mailed Apr. 15, 2010, 1 page.
U.S. Appl. No. 12/573,829 / Examiner's Search Strategy and Results dated Jun. 11, 2010, 1 page.
U.S. Appl. No. 12/573,829 / Non-Final Office Action mailed Jun. 28, 2010 with Examiner Search Strategy and Results, 103 pages.
U.S. Appl. No. 12/578,411 / Notice of Missing Parts mailed Oct. 28, 2009, 2 pages.
U.S. Appl. No. 12/578,411 / Response to Missing Parts filed Dec. 28, 2009, 25 pages.
U.S. Appl. No. 12/578,411 / Notice of Publication mailed Apr. 15, 2010, 1 page.
U.S. Appl. No. 12/627,816 / Notice of Missing Parts mailed Dec. 15, 2009, 2 pages.
U.S. Appl. No. 12/627,816 / Response to Missing Parts filed Apr. 12, 2010, 21 pages.
U.S. Appl. No. 11/006,446 / Examiner Interview Summary mailed Mar. 19, 2010, 4 pages.
U.S. Appl. No. 11/006,446 / Notice of Allowance/Allowability mailed Mar. 19, 2010, 29 pages.
U.S. Appl. No. 11/006,446 / Issue Fee Payment and 312 Amendment filed Jun. 21, 2010, 23 pages.
U.S. Appl. No. 11/319,758, filed Dec. 27, 2005, Schiffmann.
U.S. Appl. No. 11/320,538, filed Dec. 27, 2005, LeTourneau.
U.S. Appl. No. 11/412,417, filed Apr. 26, 2006, Schiffmann.
U.S. Appl. No. 11/480,094, filed Apr. 26, 2006, LeTourneau.
U.S. Appl. No. 12/627,816, filed Nov. 30, 2009, Shiffmann.
U.S. Appl. No. 12/702,243, Feb. 8, 2010, LeTourneau.
U.S. Appl. No. 12/830,236, filed Jul. 2, 2010, LeTourneau.
Dubner, M., Galil, Z and Megan, E. "Faster Tree Pattern Matching.", Journal of the Association for Computing Machinery, vol. 41, No. 2, Mar. 1994, pp. 205-213.
Ramesh, R. and Ramakrishnan, I.V., "Nonlinear Pattern Matching in Trees." Journal of the Association for Computer Machinery, vol. 39, No. 2. Apr. 1992, pp. 295-316.
Durango Bill's Enumeration of Trees. http://web.archive.org/web/20021028284112/http://www.durangobill.com/Trees.html, 1998.
Cole, Richared, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
U.S. Appl. No. 11/005,859 / Application filed Dec. 6, 2004, 120 pages.
U.S. Appl. No. 11/005,859 / Notice to File Missing parts mailed Jan. 10, 2005, 2 pages.
U.S. Appl. No. 11/005,859 / Response to Notice to File Missing parts mailed Apr. 1, 2005, 9 pages.
U.S. Appl. No. 11/005,859 / Office Action Response mailed Sep. 1, 2010, 89 pages.
U.S. Appl. No. 11/005,859 / Advisory Action mailed Sep. 14, 2010, 3 pages.
U.S. Appl. No. 11/005,859 / Notice of Appeal mailed Sep. 29, 2010, 1 page.
U.S. Appl. No. 11/005,859 / Office Action mailed Oct. 15, 2010, 5 pages.
U.S. Appl. No. 11/005,859 / Office Action Response mailed Jan. 18, 2011, 95 pages.
U.S. Appl. No. 11/005,8591 Final Office Action mailed Mar. 30, 2011, 7 pages.
U.S. Appl. No. 11/007,139 / Application filed Dec. 7, 2004, 90 pages.
U.S. Appl. No. 11/007,139 / Notice to File Missing Parts mailed Jan. 19, 2005, 2 pages.
U.S. Appl. No. 11/007,139 / Response to Notice to File Missing Parts mailed Apr. 1, 2005, 9 pages.
U.S. Appl. No. 11/007,139 / Preliminary Amendment filed Apr. 28, 2005, 146 pages.
U.S. Appl. No. 11/007,139 / Non-final Office Action mailed May 14, 2007, 58 pages.
U.S. Appl. No. 11/007,139 / Amendment filed Oct. 15, 2007, 32 pages.
U.S. Appl. No. 11/007,139 / Supplemental Response filed Oct. 17, 2007, 7 pages.
U.S. Appl. No. 11/007,139 / Non-final Office Action mailed Jan. 2, 2008 with Examiner's search results. 21 pages.
U.S. Appl. No. 11/007,139 / Amendment filed Apr. 2, 2008, 30 pages.
U.S. Appl. No. 11/007,139 / Final Office Action mailed Aug. 15, 2008, 30 pages.
U.S. Appl. No. 11/007,139 / Amendment filed Oct. 15, 2008, 26 pages.
U.S. Appl. No. 11/007,139 / Advisory Action mailed Oct. 22, 2008, 26 pages.
U.S. Appl. No. 11/007,139 / RCE with Amendment filed Nov. 14, 2008, 32 pages.
U.S. Appl. No. 11/007,139 / Non-final Office Action mailed Dec. 8, 2008, 24 pages.
U.S. Appl. No. 11/007,139 / Amendment filed May 8, 2009, 31 pages.
U.S. Appl. No. 11/007,139 / Final Office Action mailed Aug. 4, 2009, 26 pages.
U.S. Appl. No. 11/007,139 / Amendment filed Dec. 4, 2009, 28 pages.
U.S. Appl. No. 11/007,139 / Advisory Action mailed Dec. 14, 2009, 4 pages.
U.S. Appl. No. 11/007,139 / RCE with amendment filed Jan. 4, 2010, 27 pages.
U.S. Appl. No. 11/007,139 / Non-Final Office Action mailed Jan. 27, 2010, 31 pages.
U.S. Appl. No. 11/007,139 / Response to Non-Final Office Action filed Apr. 27, 2010, 30 pages.
U.S. Appl. No. 11/007,139 / Office Action mailed Jul. 20, 2010, 20 pages.
U.S. Appl. No. 11/007,139 / Office Action response mailed Oct. 20, 2010, 33 pages.
U.S. Appl. No. 11/007,139 / Advisory Action mailed Oct. 25, 2010, 2 pages.

(56) References Cited

OTHER PUBLICATIONS

U.S. Appl. No. 11/007,139 / Office Action response mailed Nov. 18, 2010, 24 pages.
U.S. Appl. No. 11/007,139 / Advisory Action mailed Dec. 1, 2010, 4 pages.
U.S. Appl. No. 11/007,139 / Office Action response and Notice of Appeal mailed Dec. 20, 2010, 29 pages.
U.S. Appl. No. 11/007,139 / Office Action mailed Jan. 3, 2011, 24 pages.
U.S. Appl. No. 11/007,139 / Office Action response, mailed May 3, 2011, 27 pages.
U.S. Appl. No. 11/006,320, filed Dec. 6, 2004, 75 pages.
U.S. Appl. No. 11/006,320 / Office Action response mailed Aug. 24, 2010, 15 pages.
U.S. Appl. No. 11/006,320 / Notice of Allowance mailed Sep. 17, 2010, 8 pages.
U.S. Appl. No. 11/006,320 / Examiner Interview Summary and supplemental Notice of Allowance mailed Dec. 17, 2010, 9 pages.
U.S. Appl. No. 11/006,320 / Rule 312 Amendment and Issue Fee payment mailed Dec. 17, 2010, 10 pages.
U.S. Appl. No. 11/006,320 / Issue Notification mailed Jan. 12, 2011, 1 page.
U.S. Appl. No. 12/972,326 / Copy of Application as filed on Dec. 17, 2010, 74 pages.
U.S. Appl. No. 12/372,326 / Filing receipt and Notice to File Missing Parts mailed Jan. 6, 2011, 5 pages.
U.S. Appl. No. 12/972,326 / Response to Notice to File Missing parts mailed Jan. 26, 2011, 14 pages.
U.S. Appl. No. 12/972,326 / Filing Receipt, mailed Feb. 18, 2011, 3 pages.
U.S. Appl. No. 12/972,326 / Preliminary amendment mailed May 20, 2011, 15 pages.
U.S. Appl. No. 12/972,326 / Notice of publication and non-compliant amendment mailed Jun. 2, 2011, 3 pages.
U.S. Appl. No. 13/014,677 / Application as filed on Jan. 26, 2011, 90 pages.
U.S. Appl. No. 13/014,677 / Notice to file missing parts and filing receipt, mailed Mar. 23, 2011, 5 pages.
U.S. Appl. No. 11/006,848 / Application as filed Dec. 7, 2004, 59 pages.
U.S. Appl. No. 11/006,848 / Notice to File Missing Parts mailed Mar. 18, 2005, 2 pages.
U.S. Appl. No. 12/573,829 / Office Action Response mailed Sep. 28, 2010, 22 pages.
U.S. Appl. No. 12/573,829 / Office Action mailed Nov. 1, 2010, 29 pages.
U.S. Appl. No. 12/573,829 / Office Action Response mailed Jan. 3, 2011, 29 pages.
U.S. Appl. No. 12/573,829 / Advisory Action mailed Jan. 7, 2011, 3 pages.
U.S. Appl. No. 12/573,829 / Notice of Appeal mailed Jan. 11, 2011, 1 page.
U.S. Appl. No. 12/573,829 / Appeal Brief, mailed May 5, 2011, 68 pages.
U.S. Appl. No. 11/006,841 / Application as filed Dec. 7, 2004, 63 pages.
U.S. Appl. No. 11/006,841 / Notice to file missing parts mailed Jan. 10, 2005, 2 pages,
U.S. Appl. No. 11/006,841 / Response to Notice to file missing parts and preliminary amendment mailed Apr. 14, 2005, 105 pages.
U.S. Appl. No. 12/578,411 / Filing receipt mailed Jan. 7, 2010, 3 pages.
U.S. Appl. No. 12/578,411 / Resposne to restriction requirement mailed Jul. 6, 2011, 19 pages.
U.S. Appl. No. 11/006,440 / Application as filed on Dec. 6, 2004, 85 pages.
U.S. Appl. No. 11/006,440 / Notice to file missing parts Jan. 11, 2005, 2 pages.
U.S. Appl. No. 11/006,440 / Response to Notice to file missing parts mailed Mar. 15, 2005, 8 pages.
U.S. Appl. No. 12/627,816 / Filing Receipt mailed Apr. 20, 2010, 3 pages.
U.S. Appl. No. 12/627,816 / Notice of Publication mailed Jul. 29, 2010, 1 page.
U.S. Appl. No. 12/627,816 / Non-Final OA, mailed May 5, 2011, 19 pages.
U.S. Appl. No. 11/006,446 / Application filed Dec. 6, 2004, 91 pages.
U.S. Appl. No. 11/006,446 / Notice of Missing Parts mailed Jan. 24, 2005, 3 pages.
U.S. Appl. No. 11/006,446 / Response to Notice to File Missing Parts mailed Mar. 29, 2005, 8 pages.
U.S. Appl. No. 11/006,446 / Rule 312 Amendment mailed Aug. 19, 2010, 2 pages.
U.S. Appl. No. 11/006,446 / Formal drawings mailed Aug. 25, 2010, 29 pages.
U.S. Appl. No. 11/006,446 / Issue Notification mailed Sep. 1, 2010, 1 page.
U.S. Appl. No. 12/830,236 / Notice to File Corrected Application Papers mailed Jul. 16, 2010, 5 pages.
U.S. Appl. No. 12/830,236 / Response to Notice to File Corrected Application Papers mailed Aug. 25, 2010, 32 pages.
U.S. Appl. No. 12/830,236 / Filing receipt mailed Sep. 3, 2010, 3 pages.
U.S. Appl. No. 12/830,236 / Notice of Publication mailed Dec. 16, 2010, 1 page.
U.S. Appl. No. 12/830,236 / Restriction requirement mailed Mar. 18, 2011, 6 pages.
U.S. Appl. No. 12/830,236 / Restriction requirement response, mailed Apr. 18, 2011, 5 pages.
U.S. Appl. No. 12/830,236 / Non-Final Office Action, mailed May 11, 2011, 10 pages.
U.S. Appl. No. 12/385,257 / Application filed Mar. 20, 2006, 118 pages.
U.S. Appl. No. 12/385,257 / Notice of Missing Parts mailed May 3, 2006, 2 pages.
U.S. Appl. No. 12/385,257 / Response to Missing Parts filed Aug. 3, 2006, 46 pages.
U.S. Appl. No. 12/385,257 / Notice of Publication mailed Nov. 30, 2006, 1 page.
U.S. Appl. No. 12/385,257 / RCE mailed Aug. 12, 2010, 35 pages.
U.S. Appl. No. 11/385,257 / Office Action mailed Sep. 30, 2010, 39 pages.
U.S. Appl. No. 11/385,257 / Office Action response, mailed Mar. 29, 2011, 31 pages.
U.S. Appl. No. 11/319,758 / Notice of Missing Parts mailed Feb. 1, 2006, 2 pages.
U.S. Appl. No. 11/319,758 / Response to Missing Parts filed Jul. 3, 2006, 15 pages.
U.S. Appl. No. 11/319,758 / Office Action response mailed Jul. 29, 2010, 30 pages.
U.S. Appl. No. 11/319,758 / Final Office Action mailed Oct. 28, 2010, 31 pages.
U.S. Appl. No. 11/319,758 / Request for Continued Examination, mailed Mar. 28, 2011, 32 pages.
U.S. Appl. No. 11/006,842 / Application as filed on Dec. 7, 2004, 58 pages.
U.S. Appl. No. 11/006,842 / Notice to file missing parts Jan. 10, 2005, 2 pages.
U.S. Appl. No. 11/006,842 / Response to Notice to file missing parts mailed Apr. 1, 2005, 7 pages.
U.S. Appl. No. 11/006,842 / Preliminary Amendment mailed May 2, 2005, 93 pages.
U.S. Appl. No. 11/006,842 / Issue notification mailed Nov. 18, 2009, 1 page.
U.S. Appl. No. 12/613,450 / Filing receipt mailed Jan. 27, 2010, 3 pages.
U.S. Appl. No. 12/613,450 / Notice of Publication mailed May 6, 2010, 1 page.
U.S. Appl. No. 11/320,538 / Notice of Missing Parts mailed Feb. 2, 2006, 2 pages.
U.S. Appl. No. 11/320,538 / Response to Missing Parts filed Aug. 2, 2006, 36 pages.

(56) References Cited

OTHER PUBLICATIONS

U.S. Appl. No. 11/320,538 / Office action mailed Dec. 22, 2010, 10 pages.
U.S. Appl. No. 11/320,538 / Notice of Appeal, mailed May 23, 2011, 6 pages.
U.S. Appl. No. 11/320,538 / Pre-brief appeal conference decision mailed Jun. 30, 2011, 2 pages.
U.S. Appl. No. 11/361,500 / Application as filed on Feb. 23, 2006, 72 pages.
U.S. Appl. No. 11/361,500 / Notice to file missing parts mailed Mar. 23, 2006, 2 pages.
U.S. Appl. No. 11/361,500 / Response to Notice to File Missing Parts mailed Jul. 19, 2006, 27 pages.
U.S. Appl. No. 11/361,500 / Notice of Publication mailed Nov. 16, 2006, 1 page.
U.S. Appl. No. 11/361,500 / Issue Fee Payment and Rule 312 Amendment mailed Jan. 6, 2010, 28 pages.
U.S. Appl. No. 11/361,500 / Response to Rule 312 Amendment Jan. 25, 2010, 4 pages.
U.S. Appl. No. 11/361,500 / Issue Notification mailed Feb. 24, 2010, 1 page.
U.S. Appl. No. 12/702,243 / Filing receipt mailed May 4, 2010, 3 pages.
U.S. Appl. No. 12/702,243 / Notice of Publication mailed Aug. 12, 2010, 1 page.
U.S. Appl. No. 11/412,417 / Application filed Apr. 26, 2006, 96 pages.
U.S. Appl. No. 11/412,417 / Notice of Missing Parts mailed May 19, 2006, 2 pages.
U.S. Appl. No. 11/412,417 / Response to Notice of Missing Parts filed Jul. 19, 2006, 14 pages.
U.S. Appl. No. 11/412,417 / Supplemental Office Action Response mailed Jun. 22, 2010, 22 pages.
U.S. Appl. No. 11/412,417 / Notice of Allowance and bibliographic data sheet mailed Jul. 6, 2010, 9 pages.
U.S. Appl. No. 11/412,417 / RCE mailed Oct. 5, 2010, 4 pages.
U.S. Appl. No. 11/412,417 / Notice of Allowance and bibliographic data sheet mailed Oct. 26, 2010, 4 pages.
U.S. Appl. No. 11/412,417 / Issue Fee Payment and Comments on Reasons for Allowance mailed Jan. 26, 2011, 6 pages.
U.S. Appl. No. 11/412,417 / Issue Notification mailed Feb. 9, 2011, 1 page.
U.S. Appl. No. 13/030,084 / Application filed Feb. 17, 2011, 103 pages.
U.S. Appl. No. 13/030,084 / Filing receipt and Notice to File Missing parts mailed Mar. 3, 2011, 6 pages.
U.S. Appl. No. 11/480,094 / Notice to File Corrected Application Papers mailed Aug. 2, 2006, 2 pages.
U.S. Appl. No. 11/480,094 / Response to Notice to File Corrected Application Papers filed Nov. 2, 2006, 32 pages.
U.S. Appl. No. 11/480,094 / Filing Receipt mailed Dec. 7, 2006, 3 pages.
U.S. Appl. No. 11/480,094 / Office Action mailed Dec. 15, 2010, 15 pages.
U.S. Appl. No. 11/480,094 / Office Action response, mailed May 16, 2011, 29 pages.
Alderson et al., "Toward an Optimization Driven Framework for Designing and Generating Realistic Internet Topologies" ACM SIGCOMM Computer Communications Review 41, vol. 33, No. 1, pp. 41-46,.
Sproat et al., "Compilation of Weighted Finite-State Tranducers from Decision Trees" ACM, pp. 215-222, 1996.
Benedikt et al., "Definable Relations and First-Order Query Languages over Strings" Journal of the ACM, vol. 50, No. 5, pp. 694-751, 2003.
Malhotra et al, "A Methodology for Formal Expression of Hierarchy in Model Solution", IEEE, pp. 258-267,1983.
U.S. Appl. No. 13/229,624 / Non-Final Office Action Response, Mailed Aug. 1, 2014, 9 Pages.
U.S. Appl. No. 13/229,624 / Final Rejection. Mailed Oct. 30, 2014, 6 pages.
U.S. Appl. No. 14/086,837 / Application as Filed on Nov. 21, 2013, 68 Pages.
U.S. Appl. No. 14/086,837 / Notice to File Missing Parts, Mailed Dec. 12, 2013, 5 Pages.
U.S. Appl. No. 14/086,837 / Applicant Resonse to Pre-Exam Formalities Notice, Mailed Jun. 11, 2014, 26 Pages.
U.S. Appl. No. 14/086,837 / Notice of Publication, Mailed Sep. 25, 2014, 4 Pages.
U.S. Appl. No. 14/086,837 / Terminal Disclaimer, Filed Nov. 14, 2014, 1 page.
U.S. Appl. No. 14/086,808 / Application as Filed on Nov. 21, 2013, 87 Pages.
U.S. Appl. No. 14/086,808 / Notice to File Missing Parts and Filing Receipt, Mailed Dec. 11, 2013, 5 Pages.
U.S. Appl. No. 14/086,808 / Applicant Response to Pre- Exam Formalities Notice, Mailed Jun. 11, 2014, 53 Pages.
U.S. Appl. No. 14/086,808 / Filing receipt, Mailed Jun. 17, 2014, 3 Pages.
U.S. Appl. No. 14/086,808 / Notice of Publication, Mailed Sep. 25, 2014, 1 Page.
U.S. Appl. No. 14/086,808 / Terminal Disclaimer, Filed Oct. 24, 2014, 2 pages..
U.S. Appl. No. 14/086,808 / Terminal Disclaimer Review Decision, Mailed Oct. 29, 2014, 1 page.
U.S. Appl. No. 14/086,808 / Terminal Disclaimer, Filed Nov. 4, 2014, 2 pages..
U.S. Appl. No. 14/086,808 / Terminal Disclaimer Review Decision, Mailed Nov. 13, 2014, 1 page.
U.S. Appl. No. 13/625,812 / Notice of Appeal, filed May 5, 2014, 1 Page.
U.S. Appl. No. 13/625,812 / Request for Continued Examination, Mailed Aug. 4, 2014, 18 Pages.
U.S. Appl. No. 13/625,812 / Request for Corrected Filing Receipt, Mailed Aug. 21, 2014, 6 Pages.
U.S. Appl. No. 13/625,812 / Filing Receipt, Mailed Aug. 27, 2014, 3 Pages.
U.S. Appl. No. 13/632,581 / Application as Filed on Oct. 1, 2012, 88 Pages.
U.S. Appl. No. 13/632,581 / Notice to File Missing Parts and Filing Receipt, Mailed Oct. 22, 2012, 27 Pages.
U.S. Appl. No. 13/632,581 / Filing Receipt, Mailed Mar. 5, 2004, 3 Pages.
U.S. Appl. No. 13/632,581 / Notice of Publication, Mailed Jun. 13, 2013, 1 Page.
U.S. Appl. No. 13/632,581 / Non-final Office Action, Mailed Jul. 3, 2013, 22 Pages.
U.S. Appl. No. 13/632,581 / Non-Final Office Action Response, Mailed Sep. 11, 2013, 23 Pages.
U.S. Appl. No. 13/632,581 / Final Office Action, Mailed Dec. 18, 2013, 27 Pages.
U.S. Appl. No. 13/632,581 / Response After Final Action, Mailed Mar. 18, 2014, 37 Pages.
U.S. Appl. No. 13/632,581 / Advisory Action (PTOL-303), Mailed Apr. 3, 2014, 4 Pages.
U.S. Appl. No. 13/632,581 / Notice of Appeal Filed Jul. 17, 2014, 2 Pages.
U.S. Appl. No. 13/632,581 / Request for Continues Examination, Mailed Jul. 16, 2014, 23 Pages.
U.S. Appl. No. 13/632,581 / Notice Non-Compliant Amendment, Mailed Oct. 20, 2014, 5 pages.
U.S. Appl. No. 13632,581 / Amendment/Req Reconsideration after Non-Final Reject, Filed Nov. 4, 2014, 16 pages.
U.S. Appl. No. 13/632,581 / Amendment After Final or Under 37CFR 1.312, initialed by the Examiner, Mailed Jan. 14, 2014, 2 Pages.
U.S. Appl. No. 12/613,450 / Issue Notification, Mailed Jan. 22, 2014, 1 Page.
U.S. Appl. No. 14/149,749 / Application as Filed on Jan. 7, 2014, 59 Pages.
U.S. Appl. No. 14/149,749 / Notice to File Missing Parts and Filing Receipt, Mailed Jan. 23, 2014, 6 Pages.

(56) References Cited

OTHER PUBLICATIONS

U.S. Appl. No. 14/149,749 / Applicant Response to Pre- exam Formalities Notice, Mailed May 23, 2014 12 Pages.
U.S. Appl. No. 14/149,749 / Applicant Response to Pre- Exam Formalities Notice, Mailed Aug. 25, 2014, 103 Pages.
U.S. Appl. No. 14/149,749 / Filing Receipt, Mailed Sep. 4, 2014, 3 Pages.
U.S. Appl. No. 14/086,741 / Application as Filed on Dec. 12, 2013, 77 Pages.
U.S. Appl. No. 14/086,741 / Filing Receipt and Notice to File Missing Parts, Mailed Dec. 12, 2013, 6 Pages.
U.S. Appl. No. 14/086,741 / Applicant Response to Pre- Exam Formalities Notice, Mailed Jun. 12, 2014, 60 Pages.
U.S. Appl. No. 14/086,741 / Filing Receipt, Mailed Jun. 17, 2014, 3 Pages.
U.S. Appl. No. 14/086,741 / Notice of Publication, Mailed Sep. 25, 2014, 1 Page.
U.S. Appl. No. 14/086,741 / Terminal Disclaimer as Filed on Sep. 29, 2014, 1 Page.
U.S. Appl. No. 14/086,741 / Terminal Disclaimer Review Decision, Mailed Sep. 30, 2014, 1 Page.
U.S. Appl. No. 14/086,741 / Notice of Allowance and Fees Due, Filed Oct. 3, 2014, 22 pages.
U.S. Appl. No. 13/860,482 / Application as Filed on Apr. 10, 2013, 98 Pages.
U.S. Appl. No. 13/860,482 / Notice to File Missing Parts and Filing Receipt, Mailed May 21, 2013, 5 Pages.
U.S. Appl. No. 13/860,482 / Applicant Response to Pre-Exam Formalities Notice, Mailed Oct. 22, 2013, 3 Pages.
U.S. Appl. No. 13/860,482 / Notice of Publication, Mailed Feb. 6, 2014, 1 Page.
U.S. Appl. No. 13/860,482 / Non-Final Office Action, Mailed Jun. 9, 2014, 11 Pages.
U.S. Appl. No. 13/860,482 / Non-Final Office Action Response, Mailed Sep. 8, 2014, 19 Pages.
U.S. Appl. No. 13/860,482 / Terminal Disclaimer Review Decision, Sep. 9, 2014, 1 page.
U.S. Appl. No. 13/860,482 / Terminal Disclaimer Filed, Oct. 8, 2014, 1 page.
U.S. Appl. No. 13/860,482 / Terminal Disclaimer Review Decision, Oct. 9, 2014, 1 page.
U.S. Appl. No. 13/860,482 / Notice of Allowance and Fees Due, Mailed Nov. 5, 2014, 8 pages.
U.S. Appl. No. 13/030,084 / Amendment Submitted/Entered with Filing of CPA/RCE, Mailed May 19, 2014, 38 Pages.
U.S. Appl. No. 13/030,084 / Advisory Action (PTOL-303), Mailed Jun. 6, 2014, 4 Pages.
U.S. Appl. No. 13/030,084 / Applicant Initiated Interview Summary (PTOL-413), Mailed Jul. 1, 2014, 3 Pages.
U.S. Appl. No. 13/030,084 / Request for Continued Examination, Mailed Aug. 15, 2014, 26 Pages.
U.S. Appl. No. 11/005,859 / Notice of Allowance and Fees Due, mailed Jun. 9, 2011, 11 pages.
U.S. Appl. No. 11/005,859 / Amendment after Notice of Allowance and Issue Fee Payment, mailed Sep. 9, 2011, 2 pages.
U.S. Appl. No. 11/005,859 / Issue Notification, mailed. Sep. 21, 2011, 1 page.
U.S. Appl. No. 13/229,624 / Application as filed on Sep. 9, 2011, 139 pages.
U.S. Appl. No. 13/229,624 / Filing receipt, mailed Sep. 21, 2011, 4 pages.
U.S. Appl. No. 13/229,624 / Non-Final Office Action, mailed Nov. 23, 2011, 8 pages.
U.S. Appl. No. 13/229,624 / Notice of Publication, mailed Dec. 30, 2011, 1 page.
U.S. Appl. No. 13/229,624 / Amendment, mailed Feb. 23, 2012, 22 pages.
U.S. Appl. No. 13/229,624 / Final Office Action, mailed Mar. 20, 2012, 10 pages.
U.S. Appl. No. 13/229,624 / Amendment after final, mailed Jun. 13, 2012, 25 pages.
U.S. Appl. No. 13/229,624 / Advisory Action, mailed Jun. 20, 2012, 4 pages.
U.S. Appl. No. 13/229,624 / RCE, mailed Jul. 20, 2012, 26 pages.
U.S. Appl. No. 13/229,624 / Non-Final Rejection, mailed Oct. 2, 2013, 9 pages.
U.S. Appl. No. 13/229,624 / Response to non-final office action, mailed Dec. 27, 2013, 11 pages.
U.S. Appl. No. 13/229,624 / Non-Final Office Action, Mailed Apr. 4, 2014, 5 Pages.
U.S. Appl. No. 12/972,326 / Preliminary amendment mailed Jul. 5, 2011, 21 pages.
U.S. Appl. No. 12/972,326 / Notice of additional fee due, mailed Jul. 12, 2011, 2 pages.
U.S. Appl. No. 12/972,326 / Preliminary Amendment mailed Aug. 10, 2011, 7 pages.
U.S. Appl. No. 12/972,326 / Non-Final Office Action, mailed Feb. 23, 2012, 9 pages.
U.S. Appl. No. 12/972,326 / Abandonment, mailed Sep. 18, 2012, 2 pages.
U.S. Appl. No. 13/014,677 / Notice of Abandonment mailed Nov. 29, 2011, 2 pages.
U.S. Appl. No. 12/573,829 / Examiner's Answer to Appeal Brief, mailed Jul. 21, 2011, 31 pages,
U.S. Appl. No. 12/573,829 / Reply brief filed Sep. 21, 2011, 17 pages.
U.S. Appl. No. 12/573,829 / Reply brief noted Oct. 5, 2011, 2 pages.
U.S. Appl. No. 12/573,829 / Appeal Docketing notice Oct. 11, 2011, 2 pages.
U.S. Appl. No. 12/578,411 / Restriction requirement mailed Jun. 8, 2011, 6 pages.
U.S. Appl. No. 12/578,411 / Response to restriction requirement mailed Jul. 6, 2011, 19 pages.
U.S. Appl. No. 12/578,411 / Non-Final Office Action mailed Aug. 23, 2011, 19 pages.
U.S. Appl. No. 12/578,411 / Non-Final Office Action response mailed Dec. 22, 2011, 38 pages.
U.S. Appl. No. 12/578,411 / Final Rejection mailed Jan. 20, 2012, 16 pages.
U.S. Appl. No. 12/578,411 / Amendment, mailed May 21, 2012, 23 pages.
U.S. Appl. No. 12/578,411 / Advisory Action, mailed May 31, 2012, 4 pages.
U.S. Appl. No. 12/578,411 / RCE, mailed Jun. 12, 2012, 38 pages.
U.S. Appl. No. 12/578,411 / Notice of Allowance, mailed Aug. 19, 2013, 19 pages.
U.S. Appl. No. 12/578,411 / Issue fee payment and Rule 312 amendment, mailed Nov. 14, 2013, 14 pages.
U.S. Appl. No. 12/578,411 / Examiner response to rule 312 amendment, mailed Nov. 19, 2013, 2 pages.
U.S. Appl. No. 12/578,411 / Response to Amendment under rule 312, mailed Dec. 3, 2013, 3 pages.
U.S. Appl. No. 12/578,411 / Issue notification, mailed Dec. 18, 2013, 1 page.
U.S. Appl. No. 12/627,816 / Non-Final Oa response, mailed Nov. 7, 2011, 12 pages.
U.S. Appl. No. 12/627,816 / Final Rejection mailed Nov. 17, 2011, 18 pages.
U.S. Appl. No. 12/627,816 / RCE mailed Feb. 17, 2012, 20 pages.
U.S. Appl. No. 12/627,816 / Terminal disclaimer review, mailed Mar. 7, 2012, 1 page.
U.S. Appl. No. 12/627,816 / Notice of Allowance, mailed Aug. 1, 2013, 16 pages.
U.S. Appl. No. 12/627,816 / Issue feel payment and Rule 312 amendment, mailed Nov. 1, 2013, 14 pages.
U.S. Appl. No. 12/627,816 / Examiner response to rule 312 amendment, mailed Nov. 13, 2013, 2 pages.
U.S. Appl. No. 12/627,816 / Issue Notification, mailed Nov. 26, 2013, 1 page.
U.S. Appl. No. 12/830,236 / Response to Non-Final Office Action mailed Jul. 6, 2011, 18 pages.

(56) References Cited

OTHER PUBLICATIONS

U.S. Appl. No. 12/830,236 / Final Office Action, mailed Oct. 14, 2011, 18 pages.
U.S. Appl. No. 12/830,236 / Amendment after final, filed Jan. 17, 2012, 26 pages.
U.S. Appl. No. 12/830,236 / Advisory Action, mailed Feb. 8, 2012, 6 pages.
U.S. Appl. No. 12/830,236 / Notice of Appeal filed Mar. 8, 2012, 3 pages
U.S. Appl. No. 12/830,236 / RCE, filed Jun. 5, 2012, 23 pages.
U.S. Appl. No. 12/830,236 / Non-Final Office Action, mailed Jul. 31, 2012, 18 pages.
U.S. Appl. No. 12/830,236 / Response after final, mailed Jun. 27, 2013, 36 pages.
U.S. Appl. No. 12/830,236 / Advisory action, mailed Jul. 12, 2013, 4 pages.
U.S. Appl. No. 12/830,236 / Notice of appeal, filed Jul. 19, 2013, 2 pages.
U.S. Appl. No. 12/830,236 / Appeal brief, filed Sep. 18, 2013, 44 pages.
U.S. Appl. No. 12/830,236 / Examiners answer to appeal brief, mailed Dec. 18, 2013, 35 pages.
U.S. Appl. No. 12/830,236 / Reply Brief as Filed on Feb. 18, 2014, 16 Pages.
U.S. Appl. No. 12/830,236 / Appeal Docketing Notice, Mailed Mar. 21, 2014, 2 Pages.
U.S. Appl. No. 11/385,257 / Final Rejection mailed Jun. 1, 2011, 40 pages.
U.S. Appl. No. 11/385,257 / Request for continued Examination mailed Nov. 1, 2011, 30 pages.
U.S. Appl. No. 11/385,257 / Non-Final Office Action, mailed Jan. 9, 2012, 40 pages.
U.S. Appl. No. 11/385,257 / Amendment, mailed Apr. 6, 2012, 30 pages.
U.S. Appl. No. 11/385,257 / Notice of allowance and Examiner interview summary, mailed Jun. 22, 2012, 36 pages.
U.S. Appl. No. 11/385,257 / Office communication concerning previous IDS filing, mailed Oct. 4, 2012, 4 pages.
U.S. Appl. No. 11/385,257 / Miscellaneou Communication to Applicant mailed Oct. 15, 2012, 3 pages.
U.S. Appl. No. 11/385,257 / Rule 321 Amendment, mailed Dec. 12, 2012, 10 pages.
U.S. Appl. No. 11/385,257 / Issue Notification, mailed Dec. 22, 2012, 1 page.
U.S. Appl. No. 13/625,812 / Application as filed on Sep. 24, 2012, 123 pages.
U.S. Appl. No. 13/625,812 / Notice to file missing parts, mailed Oct. 15, 2012, 6 pages.
U.S. Appl. No. 13/625,812 / Resonse to Notice to file missing parts and preliminary amendment, mailed Mar. 8, 2013, 47 pages.
U.S. Appl. No. 13/625,812 / Notice of incomplete reply, mailed Mar. 15, 2013, 3 pages.
U.S. Appl. No. 13/625,812 / Response to incomplete reply notice, mailed Apr. 2, 2013, 5 pages.
U.S. Appl. No. 13/625,812 / Non-Final office action, mailed Jul. 26, 2013, 29 pages.
U.S. Appl. No. 13/625,812 / Publication notice, mailed Aug. 1, 2013, 1 page.
U.S. Appl. No. 13/625,812 / Response to non-final office action, mailed Oct. 9, 2013, 15 pages.
U.S. Appl. No. 13/625,812 / Final rejection, mailed Dec. 3, 2013, 28 pages.
U.S. Appl. No. 13/625,812 / Response After Final Action, Mailed Apr. 1, 2014, 1 Page.
U.S. Appl. No. 13/625,812 / Advisory Action (Ptol-303), Mailed Apr. 9, 2013, 3 Pages.
U.S. Appl. No. 11/319,758 / Non-Final office action mailed Jun. 3, 2011, 31 pages.
U.S. Appl. No. 11/319,758 / Non-Final Office Action Response mailed Nov. 3, 2011, 29 pages.
U.S. Appl. No. 11/319,758 / Final Office Action, mailed Jan. 17, 2012, 22 pages.
U.S. Appl. No. 11/319,758 / Amendment after final, mailed May 17, 2012, 34 pages.
U.S. Appl. No. 11/319,758 / Advisory Action, mailed Jun. 20, 2012, 3 pages.
U.S. Appl. No. 11/319,758 / Amendment after final, mailed Jun. 28, 2012, 29 pages.
U.S. Appl. No. 11/319,758 / Notice of Allowance and examiner's interview summary, mailed Jul. 17, 2012, 10 pages.
U.S. Appl. No. 11/319,758 / Issue Fee payment, Rule 312 and Miscellaneous Communication, mailed Oct. 12, 2012, 12 pages.
U.S. Appl. No. 11/319/758 / Issue Notification, mailed Oct. 31, 2012, 1 page.
U.S. Appl. No. 12/613,450 / Restriction requirement mailed Jun. 10, 2011, 5 pages.
U.S. Appl. No. 12/613,450 / Response to restriction requirement mailed Jul. 6, 2011, 17 pages.
U.S. Appl. No. 12/613,450 / Non-Final Office Action, mailed Aug. 25, 2011, 15 pages.
U.S. Appl. No. 12/613,450 / Non-Final OA response mailed Dec. 27, 2011, 28 pages.
U.S. Appl. No. 12/613,450 / Final rejection, mailed Feb. 14, 2012, 14 pages.
U.S. Appl. No. 12/613,450 / Amendment after final, mailed Jun. 8, 2012, 23 pages.
U.S. Appl. No. 12/613,450 / Advisory Action, mailed Jun. 20, 2012, 4 pages.
U.S. Appl. No. 12/613,450 / RCE, mailed Jul. 12, 2012, 25 pages.
U.S. Appl. No. 12/613,450 / Notice of Allowance, mailed Oct. 7, 2013, 20 pages.
U.S. Appl. No. 12/613,450 / Electronic Terminal Disclaimer filed and approved, Jan. 2, 2014, 2 pages.
U.S. Appl. No. 11/320,538 / Request for Continued Examination mailed Dec. 23, 2011, 21 pages.
U.S. Appl. No. 11/320,538 / Non-Final Office Action, mailed Dec. 19, 2012, 12 pages.
U.S. Appl. No. 11/320,538 / Response to Non-final office action, mailed Apr. 17, 2013, 20 pages.
U.S. Appl. No. 11/320,538 / Notice of allowance, mailed Aug. 1, 2013, 25 pages.
U.S. Appl. No. 11/320,538 / Issue fee payment, mailed Nov. 1, 2013, 7 pages.
U.S. Appl. No. 11/320,538 / Rule 312 amendment, mailed Nov. 19, 2013, 20 pages.
U.S. Appl. No. 11/320,538 / Issue Notification, mailed Dec. 4, 2013, 1 page.
U.S. Appl. No. 12/702,243 / Non-Final rejection, mailed Aug. 30, 2012, 8 pages.
U.S. Appl. No. 12/702,243 / Amendment, mailed Nov. 20, 2012, 14 pages.
U.S. Appl. No. 12/702,243 / Terminal Disclaimer, mailed Jan. 2, 2013, 5 pages.
U.S. Appl. No. 12/702,243 / Terminal Disclaimer decision, mailed Jan. 4, 2013, 1 page1.
U.S. Appl. No. 12/702,243 / Notice of allowance and fees due and examiner interview summart, mailed Jan. 10, 2013, pages.
U.S. Appl. No. 12/702,243 / Issue notification, mailed Apr. 24, 2013, 1 page.
U.S. Appl. No. 13/030,084 / Response to Notice to File Missing Parts, mailed Aug. 3, 2011, 23 pages.
U.S. Appl. No. 13/030,087 / Updated filing receipt, mailed Aug. 11, 2011, 3 pages.
U.S. Appl. No. 13/030,084 / Non-Final Rejection mailed Oct. 26, 2011, 34 pages.
U.S. Appl. No. 13/030,084 / Notice of Publication mailed Nov. 17, 2011, 1 page.
U.S. Appl. No. 13/030,084 / Amendment, maied Jan. 26, 2012, 35 pages.
U.S. Appl. No. 13/030,084 / Notice regarding non-compliant amendment, mailed Jan. 31, 2012, 4 pages.
U.S. Appl. No. 13/030,084 / Amendment, mailed Feb. 9, 2013, 35 pages.

(56) References Cited

OTHER PUBLICATIONS

U.S. Appl. No. 13/030,084 / Final Rejection, mailed Mar. 28, 2012, 62 pages.
U.S. Appl. No. 13/030,084 / Amendment after final, mailed Jun. 14, 2012, 88 pages.
U.S. Appl. No. 13/030,084 / Advisory Action, mailed Jun. 26, 2012, 4 pages.
U.S. Appl. No. 13/030,084 / RCE, mailed Jul. 23, 2012, 89 pages.
U.S. Appl. No. 13/030,084 / Notice regarding non-compliant amendment, mailed Jul. 25, 2012, 2 pages.
U.S. Appl. No. 13/030,084 / Amendment, mailed Jan. 2, 2013, 40 pages.
U.S. Appl. No. 13/030,084 / Refund request, mailed Jan. 23, 2013 17 pages.
U.S. Appl. No. 13/030,084 / Non-Final office action, mailed Apr. 30, 2013, 39 pages.
U.S. Appl. No. 13/030,084 / Response to non-final office action, mailed Jul. 30, 2013, 28 pages.
U.S. Appl. No. 13/030,084 / Non-final office action, mailed Oct. 10, 2013, 44 pages.
U.S. Appl. No. 13/030,084 / Response after Non-Final Reject, Mailed Jan. 2, 2014, 1 Page.
U.S. Appl. No. 13/030,084 / Final Rejection, Mailed Mar. 19, 2014, 41 Pages.
U.S. Appl. No. 11/480,094 / Final Office Action, mailed Aug. 1, 2011, 13 pages.
U.S. Appl. No. 11/480,094 / Amendment after final Nov. 1, 2011, 32 pages.
U.S. Appl. No. 11/480,094 / Advisory Action mailed Nov. 14, 2011, 3 pages.
U.S. Appl. No. 11/480,094 / Notice of Appeal mailed Nov. 28, 2011, 1 page.
U.S. Appl. No. 11/480,094 / Abandonment, mailed Jul. 31, 2012, 2 pages.
Coenen, Frans; Leng, Paul and Ahmed, Shakil; "T-Trees, Vertical Partitioning and Distributed Association Rule Mining", IEEE, 2003.
Ferragina et al., "The String B-Tree: A New Data Structure for String Search in External Memory and Its Applications", Journal of the ACM, vol. 46, No. 2, pp. 236-280, 1999.
Hoffman et al., "Pattern Matching in Trees", Purdue University, Jan. 1982, Journal for the Association for Computing Machinery, vol. 29, Issue 1, pp. 68-95.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Prasad et al., "Efficient Bit-Parallel Multi-Patterns String Matching Algorithms for Limited Expression", ACM, pp. 1-6, 2010.
Schmidt et al., "Comparision of Tree and Graph Encodings as Function of Problem Complexity", ACM, pp. 1674-1679, 2007.
Sinha et al, "Efficient Trie Based Sorting of Large Sets of Strings," ACM, pp. 1-8, 2003.
Somani et al., "Phased-Mission System Analysis Using Boolean Algebraic Methods", May 1994, ACM Press, vol. 22, Issue 1.
Spinells "Declarative Peephole Optimization Using String Pattern Matching", ACM, pp. 47-51, 1999.
Thiemann, "Grammar-Based Analysis of String Expressions", ACM, pp. 59-70, 2005.
Wagner et al., "The String-to-String Correction Problem", Journal of the Association for Computing Machinery, vol. 21, No. 1, pp. 168-173, 1974.
Xie et al., "S-Looper: Automatice Summarization for Multipath String Loops", ACM, pp. 188-198, 2015.
Yates et al, "A New Approach to Text Searchin", Communications of the ACM, vol. 35, No. 10, pp. 74-82, 1992.
U.S. Appl. No. 13/229,624 / Response and Amendments after Final, filed Jan. 30, 2015, 11 pages.
U.S. Appl. No. 13/229,624 / Advisory Action, mailed Mar. 11, 2015, 3 pages.
U.S. Appl. No. 13/229,624 / Applicant Initiated Interview Summary, mailed Mar. 19, 2015, 3 pages.
U.S. Appl. No. 13/229,624 / Response After Final Action and Interview Summary, filed Mar. 27, 2015, 20 pages.
U.S. Appl. No. 13/229,624 / RCE and Amendments, filed Apr. 27, 2015, 17 pages.
U.S. Appl. No. 13/229,624 / Notice of Allowance and Fees, mailed Jul. 6, 2015, 21 pages.
U.S. Appl. No. 13/229,624 / Issue Fee Payment, Sep. 28, 2015, 1 page.
U.S. Appl. No. 13/229,624 / Issue Notification, Oct. 14, 2015, 1 page.
U.S. Appl. No. 14/870,744 / Application as filed, Sep. 30, 2015, 127 pages.
U.S. Appl. No. 14/870,744 / Preliminary Amendments, Oct. 6, 2015, 10 pages.
U.S. Appl. No. 14/870,744 / Notice to File Missing Parts, Oct. 16, 2015, 2 pages.
U.S. Appl. No. 14/870,744 / Filing Receipt, Oct. 16, 2015, 3 pages.
U.S. Appl. No. 14/870,744 / Applicant Response to Pre-Exam Formalities Notice, Feb. 19, 2016, 2 pages.
U.S. Appl. No. 14/870,744 / Filing Receipt, Mar. 2, 2016, 3 pages.
U.S. Appl. No. 14/870,744 / A Notice of Publication, Jun. 9, 2016, 1 page.
U.S. Appl. No. 15/043,267 / Application as filed Feb. 12, 2016, 92 pages.
U.S. Appl. No. 15/043,267 / Preliminary Amendment, Feb. 12, 2016, 7 pages.
U.S. Appl. No. 15/043,267 / Filing Receipt, Mar. 7, 2016, 3 pages.
U.S. Appl. No. 15/043,267 / Preliminary Amendment, Jun. 10, 2016, 9 pages.
U.S. Appl. No. 15/043,267 / Filing Receipt, Oct. 25, 2016, 3 pages.
U.S. Appl. No. 12/573,829 / Non-Final Rejection and Examiner's Search, mailed Apr. 28, 2015, 22 pages.
U.S. Appl. No. 12/573,829 / Amendment/Req. Reconsideration After Non-Final Rejection, filed Jul. 27, 2015, 21 pages.
U.S. Appl. No. 12/573,829 / Final Rejection and Examiner search, mailed Sep. 15, 2015, 17 pages.
U.S. Appl. No. 12/573,829 / Response After Final Action, Nov. 16, 2015, 17 pages.
U.S. Appl. No. 12/573,829 / Advisory Action, Dec. 2, 2015, 4 pages.
U.S. Appl. No. 12/573,829 / Request for Continued Examination and Amendments, Dec. 14, 2015, 17 pages.
U.S. Appl. No. 12/573,829 / Non-Final Rejection, Jun. 13, 2016, 18 pages.
U.S. Appl. No. 12/573,829 / Amendment/Req. Reconsideration—After Non-Final Reject, Sep. 13, 2016, 24 pages.
U.S. Appl. No. 12/573,829 / Filing Receipt, Sep. 15, 2016, 3 pages.
U.S. Appl. No. 14/086,837 / Notice of Allowance and Fees, mailed Dec. 2, 2014, 17 pages.
U.S. Appl. No. 14/086,837 / Amendment After Notice of Allowance, filed Feb. 27, 2015, 9 pages.
U.S. Appl. No. 14/086,837 / Issue Fee Payment, filed Feb. 27, 2015, 1 page.
U.S. Appl. No. 14/086,837 / Issue Notification, May 6, 2015, 1 page.
U.S. Appl. No. 14/635,836 / Application as filed on Mar. 2, 2015, 70 pages.
U.S. Appl. No. 14/635,836 / Filing Receipt, mailed Mar. 12, 2015, 3 pages.
U.S. Appl. No. 14/635,836 / Notice to File Missing Parts, mailed Mar. 12, 2015, 2 pages.
U.S. Appl. No. 14/635,836 / Applicant Response to Pre-Exam Formalities Notice, filed May 12, 2015, 40 pages.
U.S. Appl. No. 14/635,836 / Filing Receipt, mailed May 19, 2015, 3 pages.
U.S. Appl. No. 14/635,836 / Notice of Publication, mailed Aug. 27, 2015, 1 page.
U.S. Appl. No. 14/635,836 / Electronic Terminal Disclaimer Approved and Filed, Nov. 13, 2015, 3 pages.
U.S. Appl. No. 14/635,836 / Notice of Allowance and Fees Due, Apr. 18, 2016, 25 pages.
U.S. Appl. No. 15/250,118 / Application as filed Aug. 29, 2016, 71 pages.

(56) References Cited

OTHER PUBLICATIONS

U.S. Appl. No. 15/250,118 / Preliminary Amendment, Aug. 29, 2016, 20 pages.
U.S. Appl. No. 15/250,118 / Filing Receipt, Sep. 9, 2016, 3 pages.
U.S. Appl. No. 14/086,808 / Notice of Allowance and fees, mailed Nov. 17, 2014, 16 pages.
U.S. Appl. No. 14/086,808 / Issue Fee Payment and Rule 312 amendment, filed Feb. 17, 2015, 1 page.
U.S. Appl. No. 14/086,808 / Amendment After Notice of Allowance, Feb. 17, 2015, 17 pages.
U.S. Appl. No. 14/086,808 / Response to Amendment under Rule 312, Feb. 20, 2015, 2 pages.
U.S. Appl. No. 14/086,808 / Response to Amendment under Rule 312, Feb. 25, 2015, 3 pages.
U.S. Appl. No. 14/086,808 / Issue Notification, Mar. 18, 2015, 1 page.
U.S. Appl. No. 14/625,473 / Application as filed on Feb. 18, 2015, 92 pages.
U.S. Appl. No. 14/625,473 / Filing Receipt, mailed Mar. 18, 2015, 3 pages.
U.S. Appl. No. 14/625,473 / Notice to File Missing Parts, mailed Mar. 18, 2015.
U.S. Appl. No. 14/625,473 / Response to Pro-Exam Formalities Notice and Preliminary Amendment, filed May 18, 2015, 28 pages.
U.S. Appl. No. 14/625,473 / Filing Receipt, mailed May 20, 2015, 3 pages.
U.S. Appl. No. 14/625,473 / Notice of Publication, mailed Aug. 27, 2015, 1 page.
U.S. Appl. No. 14/625,473 / Electronic Terminal Disclaimer Filed and Approved, Nov. 13, 2015, 3 pages.
U.S. Appl. No. 14/625,473 / Notice of Allowance, Mar. 28, 2016, 19 pages.
U.S. Appl. No. 14/625,473 / Issue Fee Payment and Amendments after Notice of Allowance, Jun. 28, 2016, 24 pages.
U.S. Appl. No. 14/625,473 / Response to Amendment under Rule 312, Jun. 30, 2016, 1 page.
U.S. Appl. No. 14/625,473 / Issue Notification, Jul. 20, 2016, 1 page.
U.S. Appl. No. 15/214,168 / Application as filed with preliminary amendments, Jul. 19, 2016, 116 pages.
U.S. Appl. No. 15/214,168 / Filing Receipt, Aug. 3, 2016, 4 pages.
U.S. Appl. No. 15/214,168 / Corrected Filing Receipt, Oct. 12, 2016, 4 pages.
U.S. Appl. No. 12/830,236 / Patent Board Decision, Mar. 9, 2016, 6 pages.
U.S. Appl. No. 12/830,236 / RCE and Amendments, Apr. 27, 2016, 15 pages.
U.S. Appl. No. 12/830,236 / Non-Final Rejection and Examiner Search, Jun. 29, 2016, 75 pages.
U.S. Appl. No. 12/830,236 / Amendment/Req. Reconsideration-After Non-Final Reject, Sep. 6, 2016, 12 pages.
U.S. Appl. No. 13/625,812 / Notice of Allowance and Fees, mailed Dec. 9, 2014, 20 pages.
U.S. Appl. No. 13/625,812 / Filing Receipt, mailed Feb. 2, 2015, 3 pages.
U.S. Appl. No. 13/625,812 / Filing Receipt, mailed Feb. 6, 2015, 3 pages.
U.S. Appl. No. 13/625,812 / Terminal Disclaimer Filed Mar. 2, 2015, 1 page.
U.S. Appl. No. 13/625,812 / Post Allowance Arguments/Amendments, filed Mar. 6, 2015, 6 pages.
U.S. Appl. No. 13/625,812 / Amendment After Notice of Allowance, filed Mar. 9, 2015, 3 pages.
U.S. Appl. No. 13/625,812 / Issue Fee Payment, filed Mar. 9, 2015, 1 page.
U.S. Appl. No. 13/625,812 / Terminal Disclaimer Review Decision, mailed Mar. 12, 2015.
U.S. Appl. No. 14/641,735 / Application as filed on Mar. 9, 2015, 126 pages.
U.S. Appl. No. 14/641,735 / Filing Receipt, mailed Mar. 20, 2015, 3 pages.
U.S. Appl. No. 14/641,735 / Notice to File Missing Parts, mailed Mar. 20, 2015, 2 pages.
U.S. Appl. No. 14/641,735 / Notice of Incomplete Reply, mailed Jun. 26, 2015, 2 pages.
U.S. Appl. No. 14/641,735 / Applicant Response to Pre-Exam Formalities Notice and Amendments, filed Jul. 8, 2015, 32 pages.
U.S. Appl. No. 14/641,735 / Electronic Terminal Disclaimer, filed Aug. 27, 2015, 3 pages.
U.S. Appl. No. 14/641,735 / Notice of Publication, Oct. 29, 2015, 1 page.
U.S. Appl. No. 14/641,735 / Preliminary Amendment, Jan. 14, 2016, 8 pages.
U.S. Appl. No. 13/632,581 / Non-Final Rejection, mailed Jan. 27, 2015, 16 pages.
U.S. Appl. No. 13/632,581 / Amendment/Req Reconsideration Non-Final Rejection and Amendments, filed Apr. 20, 2015, 24 pages.
U.S. Appl. No. 13/632,581 / Final Rejection, mailed Jul. 20, 2015, 21 pages.
U.S. Appl. No. 13/632,581 / After Final Consideration Request and Response, Sep. 21, 2015, 28 pages.
U.S. Appl. No. 13/632,581 / Advisory Action and After Final Decision, Oct. 2, 2015, 18 pages.
U.S. Appl. No. 13/632,581 / RCE and Amendments, Nov. 30, 2015, 55 pages.
U.S. Appl. No. 13/632,581 / Notice of Allowance and Fees, Dec. 17, 2015, 5 pages.
U.S. Appl. No. 13/632,581 / Filing Receipt, Jan. 22, 2016, 4 pages.
U.S. Appl. No. 13/632,581 / Electronic Terminal Disclaimer, Mar. 7, 2016, 3 pages.
U.S. Appl. No. 13/632,581 / Issue Fee Payment, Mar. 16, 2016, 1 page.
U.S. Appl. No. 13/632,581 / Amendment after Notice of Allowance, Mar. 16, 2016 19 pages.
U.S. Appl. No. 13/632,581 / Response to Amendment under Rule 312, Mar. 22, 2016, 2 pages.
U.S. Appl. No. 13/632,581 / Issue Notification, Apr. 13, 2016, 1 page.
U.S. Appl. No. 15/081,612 / Application as Filed on Mar. 25, 2016, 87 Pages.
U.S. Appl. No. 15/081,612 / Notice to File Missing Parts and Filing Receipt, Apr. 11, 2016, 4 Pages.
U.S. Appl. No. 15/081,612 / Filing Receipt, Apr. 11, 2016, 3 Pages.
U.S. Appl. No. 15/081,612 / Applicant Response to Pre-Exam Formalities Notice and Preliminary Amendments, Jun. 13, 2016, 34 pages.
U.S. Appl. No. 15/081,612 / Preliminary Amendment, Jun. 14, 2016, 4 pages.
U.S. Appl. No. 15/081,612 / Filing Receipt, Jun. 21, 2016, 3 pages.
U.S. Appl. No. 15/081,612 / Non-Final Rejection, Jul. 27, 2016, 9 pages.
U.S. Appl. No. 15/081,612 / Electronic Terminal Disclaimer, Sep. 23, 2016, 3 pages.
U.S. Appl. No. 15/081,612 / Notice of Publication, Sep. 29, 2016, 3 pages.
U.S. Appl. No. 15/081,612 / Amendment/Req. Reconsideration—After Non-Final Reject, Oct. 17, 2016, 10 pages.
U.S. Appl. No. 15/081,612 / Notice of Allowance and Fees, Oct. 27, 2016, 5 pages.
U.S. Appl. No. 14/149,749 / Electronic Terminal Disclaimer Filed and Approved Feb. 23, 2015.
U.S. Appl. No. 14/149,749 / Examiner Initiated Interview Summary, mailed Feb. 24, 2015, 2 pages.
U.S. Appl. No. 14/149,749 / Notice of Allowance and Fees and Examiner Search, mailed Apr. 17, 2015, 30 pages.
U.S. Appl. No. 14/149,749 / Amendment after Notice of Allowance, filed May 27, 2015, 10 pages.
U.S. Appl. No. 14/149,749 / Issue Fee Payment, filed May 27, 2015, 1 page.
U.S. Appl. No. 14/149,749 / Electronic Terminal Disclaimer Filed and Approved, May 27, 2015, 3 pages.

(56) References Cited

OTHER PUBLICATIONS

U.S. Appl. No. 14/149,749 / Response to Amendment under Rule 312, May 29, 2015, 1 page.
U.S. Appl. No. 14/149,749 / Response to Amendment under Rule 312, Jun. 1, 2015, 3 pages.
U.S. Appl. No. 14/149,749 / Issue Notification, mailed Jun. 17, 2015, 1 page.
U.S. Appl. No. 14/726,192 / Application as Filed May 29, 2015, 39 pages.
U.S. Appl. No. 14/726,192 / Filing Receipt, mailed Jun. 9, 2015, 3 pages.
U.S. Appl. No. 14/726,192 / Notice to File Missing Parts, mailed Jun. 9, 2015, 2 pages.
U.S. Appl. No. 14/726,192 / Applicant Response to Pre-Exam Formalities Notice and Amendments, filed Aug. 12, 2015, 114 pages.
U.S. Appl. No. 14/726,192 / Filing Receipt, mailed Aug. 20, 2015, 3 pages.
U.S. Appl. No. 14/726,192 / Electronic Terminal Disclaimer Filed and Approved, Nov. 20, 2015, 3 pages.
U.S. Appl. No. 14/726,192 / Notice of Publication, Nov. 27, 2015, 1 page.
U.S. Appl. No. 14/726,192 / Issue Fee Payment and Amendment after Notice of Allowance, Jul. 18, 2016, 13 pages.
U.S. Appl. No. 14/726,192 / Response to Amendment under Rule 312, Jul. 21, 2016, 1 page.
U.S. Appl. No. 14/726,192 / Response to Amendment under Rule 312, Jul. 22, 2016, 2 pages.
U.S. Appl. No. 14/726,192 / Issue Notification, Aug. 3, 2016, 1 page.
U.S. Appl. No. 15/240,964 / Application and Preliminary Amendments as filed Aug. 18, 2016, 70 pp. Page 8 of 10 References Considered Except Where Lined Through . /J.N . Li.
U.S. Appl. No. 15/240,964 / Filing Receipt, Aug. 31, 2016, 3 pages.
U.S. Appl. No. 14/086,741 / Amendment after Notice of Allowance, filed Jan. 5, 2015, 14 pages.
U.S. Appl. No. 14/086,741 / Issue Fee Payment, filed Jan. 5, 2015, 1 page.
U.S. Appl. No. 14/086,741 / Response to Amendment under Rule 312, mailed Jan. 22, 2015, 2 pages.
U.S. Appl. No. 14/086,741 / Notice and Allowance and Fees and Examiner Search strategy, mailed Mar. 16, 2015, 40 pages.
U.S. Appl. No. 14/086,741 / Issue Notification, Apr. 1, 2015, 1 page.
U.S. Appl. No. 14/596,154 / Application as filed Jan. 13, 2015, 60 pages.
U.S. Appl. No. 14/596,154 / Filing Receipt, mailed Jan. 27, 2015, 3 pages.
U.S. Appl. No. 14/596,154 / Notice to File Missing Parts, mailed Jan. 27, 2015, 3 pages.
U.S. Appl. No. 14/596,154 / Applicant Response to Pre Exam Formalities Notice with Preliminary Amendments, filed Mar. 27, 2015, 85 pages.
U.S. Appl. No. 14/596,154 / Filing Receipt, mailed Apr. 2, 2015, 3 pages.
U.S. Appl. No. 14/596,154 / Notice of Publication, mailed Jul. 9, 2015, 1 page.
U.S. Appl. No. 14/596,154 / Electronic Terminal Disclaimer Filed and Approved, Nov. 20, 2015, 3 pages.
U.S. Appl. No. 13/860,482 / Issue Fee Payment and Rule 312 Amendments, filed Feb. 4, 2015, 4 pages.
U.S. Appl. No. 13/860,482 / Issue Notification, mailed Mar. 4, 2015, 1 page.
U.S. Appl. No. 14/614,292 / Application as filed on Feb. 4, 2015, 76 pages.
U.S. Appl. No. 14/614,292 / Notice to File Missing Parts and Filing Receipt, mailed Feb. 20, 2015, 5 pages.
U.S. Appl. No. 14/614,292 / Applicant Response to Pre-Exam Formalities Notice and Amendments, filed Apr. 17, 2015, 30 pages.
U.S. Appl. No. 14/614,292 / Filing Receipt, mailed Apr. 24, 2015, 3 pages.
U.S. Appl. No. 14/614,292 / Notice of Publication, mailed Aug. 6, 2015, 1 page.
U.S. Appl. No. 14/614,292 / Electronic Terminal Disclaimer Filed and Approved, Nov. 20, 2015, 3 pages.
U.S. Appl. No. 14/614,292 / Non-Final Rejection, May 19, 2016, 10 pages.
U.S. Appl. No. 14/614,292 / Amendment/Req. Reconsideration-After Non-Final Rejection, Aug. 18, 2016, 20 pages.
U.S. Appl. No. 14/614,292 / Notice of Allowance and Fees, Sep. 21, 2016, 8 pages.
U.S. Appl. No. 13/030,084 / Non-Final Rejection and Examiner's.
U.S. Appl. No. 13/030,084 / Amendment/Req. Reconsideration After Non-Final Rejection, filed Jun. 24, 2015, 28 pages.
U.S. Appl. No. 13/030,084 / Terminal Disclaimer filed and Approved, Sep. 10, 2015, 3 pages.
U.S. Appl. No. 13/030,084 / Notice of Allowance and Fees, mailed Sep. 17, 2015, 24 pages.
U.S. Appl. No. 13/030,084 / Issue Fee Payment and Amendment, Dec. 10, 2015, 4 pages.
U.S. Appl. No. 14/968,429 / Application as filed Dec. 14, 2015.
U.S. Appl. No. 14/968,429 / Filing Receipt, Jan. 4, 2016, 3 pages.
U.S. Appl. No. 14/968,429 / Applicant Response to Pre-Exam Formalities Notice, Jan. 14, 2016, 35 pages.
U.S. Appl. No. 14/968,429 / Filing Receipt, Jan. 21, 2016, 3 pages.
U.S. Appl. No. 14/968,429 / Notice of Publication, Apr. 28, 2016, 1 page.
U.S. Appl. No. 15/043,267 / Notice of Publication, Feb. 2, 2017, 1 page.
U.S. Appl. No. 12/573,829 / Amendment/Req. Reconsideration-After Non-Final Reject, Mar. 16, 2017, 18 pages.
U.S. Appl. No. 15/250,118 / Notice of Publication, Feb. 23, 2017, 1 page.
U.S. Appl. No. 15/214,168 / Non-Final Rejection, Mar. 2, 2017, 20 pages.
U.S. Appl. No. 12/830,236 / Response After Final Action, Feb. 13, 2017, 14 pages.
U.S. Appl. No. 12/830,236 / Advisory Action, Mar. 3, 2017, 2 pages.
U.S. Appl. No. 15/081,612 / RCE, Jan. 30, 2017, 2 pages.
U.S. Appl. No. 15/081,612 / Issue Fee Payment, Jan. 30, 2017, 1 page.
U.S. Appl. No. 15/081,612 / Notice of Allowance and Fees Due, Jan. 30, 2017, 2 pages.
U.S. Appl. No. 15/081,612 / Notice of Allowance and Fees Due, Feb. 13, 2017, 7 pages.
U.S. Appl. No. 15/081,612 / Amendment After Notice of Allowance, Mar. 20, 2017, 4 pages.
U.S. Appl. No. 15/081,612 / Issue Fee Payment, Mar. 20, 2017, 1 page.
U.S. Appl. No. 15/240,964 / Non-Final Rejection, Mar. 14, 2017, 23 pages.
U.S. Appl. No. 15/411,823 / Application as filed, Jan. 20, 2017, 77 pages.
U.S. Appl. No. 15/411,823 / Preliminary Amendment, Jan. 20, 2017, 25 pages.
U.S. Appl. No. 15/411,823 / Filing Receipt, Jan. 31, 2017, 3 pages.
U.S. Appl. No. 12/573,829 / Non-Final Rejection, Dec. 16, 2016, 10 pages.
U.S. Appl. No. 15/250,118 / Applicant Response to Pre-Exam Formalities Notice, Nov. 8, 2016, 21 pages.
U.S. Appl. No. 15/250,118 / Filing Receipt, Nov. 15, 2016, 3 pages.
U.S. Appl. No. 15/214,168 / Notice of Publication, Nov. 10, 2016, 1 page.
U.S. Appl. No. 12/830,236 / Final Rejection, Dec. 14, 2016, 22 pages.
U.S. Appl. No. 15/240,964 / Notice of Publication, Dec. 8, 2016.

* cited by examiner

200

400

| Natural # | BEL Trees |
|---|---|
| 0 |  |
| 1 |  |
| 2 |  |
| 3 |  |
| 4 | 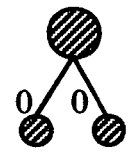 |
| 5 |  |
| 6 | 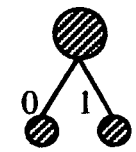 |
Fig. 5
500

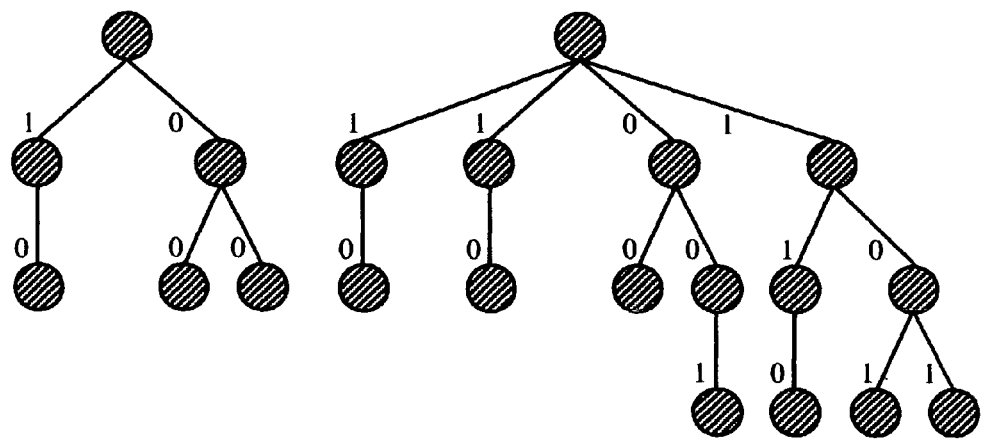
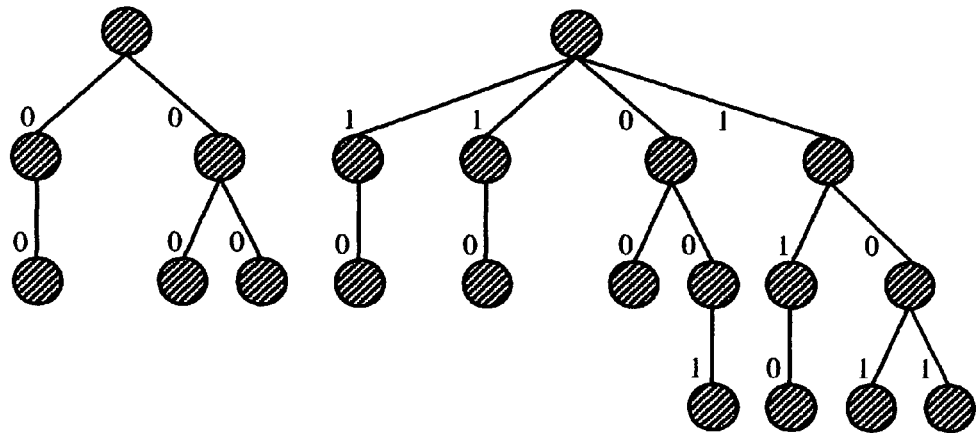
Fig. 11 x is Chapter 3 if and only if $\exists y ( (y \leq_R T) \land (y = S(S(S(c)))') \land (S(x) \leq_R y) )$, where $i \leq_R j$ means that tree $i$ is a rooted partial subtree of tree $j$.

1200

METHOD AND/OR SYSTEM FOR SIMPLIFYING TREE EXPRESSIONS SUCH AS FOR QUERY REDUCTION

This disclosure claims priority pursuant to 35 USC §119 (e) from U.S. Provisional Patent Application No. 60/575,784, filed on May 28, 2004, by Le Tourneau, titled, "METHOD AND/OR SYSTEM FOR SIMPLIFYING TREE EXPRESSIONS, SUCH AS FOR PATTERN MATCHING," assigned to the assignee of claimed subject matter.

BACKGROUND

This disclosure is related to simplifying tree expressions, such as for pattern matching.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database, and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 5 is a table illustrating an embodiment of an association between natural numerals and unordered BELTs;

FIG. 11 is a schematic diagram illustrating an embodiment of a match and a non-match for an embodiment of an ordered binary edge labeled tree.

DETAILED DESCRIPTION

Figure 1:
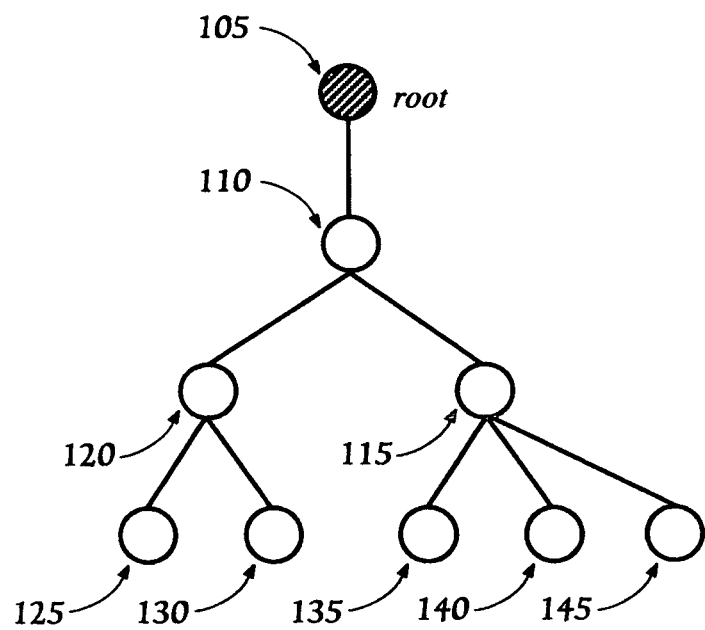
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An ordered tree is illustrated here, for example, in FIG. 1 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data and/or values may be limited to binary data, that is, in this example, either a binary one or a binary zero. Here, such an embodiment may be referred to as a binary edge labeled tree (BELT), as shall be discussed in more detail hereinafter. In this embodiment, an ordered binary edge labeled tree is shown. Here, ordered refers to the notion that there is an ordering or precedence among nodes attached to a common node corresponding to the order of the attached nodes shown in a graphical illustration.

Figure 2:
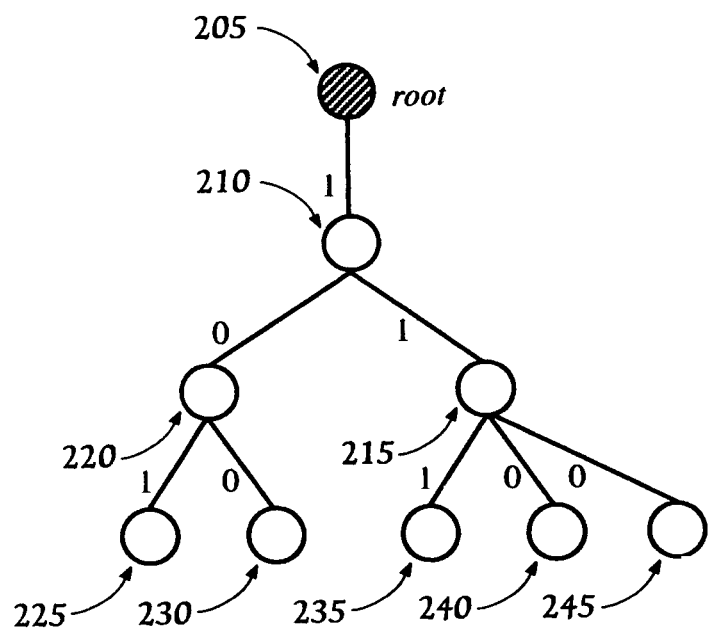
FIG. 2 is a schematic diagram illustrating one embodiment of an ordered binary edge labeled tree.
Figure 3:
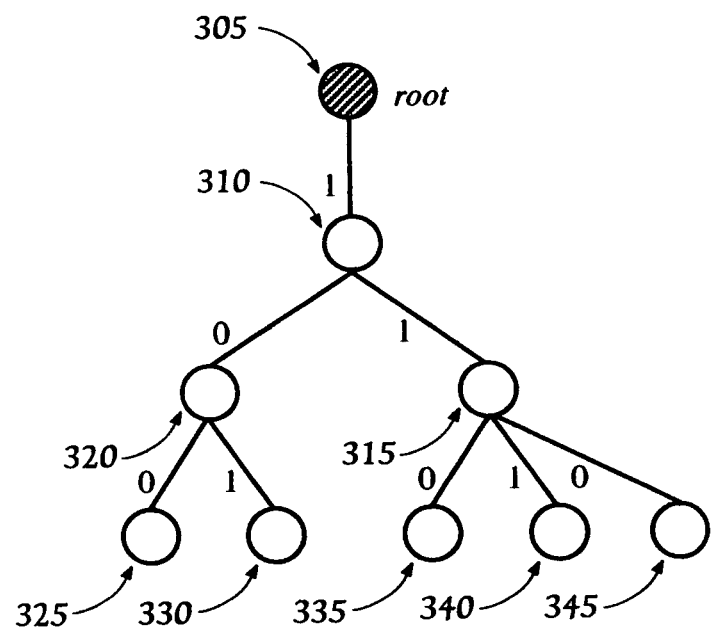
FIG. 3 is a schematic diagram illustrating another embodiment of an ordered binary edge labeled tree.

One example of an ordered BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different ordered binary edge labeled tree. It is noted that this tree is similar or isomorphic in arrangement or structure to the embodiment of FIG. 2, as shall be explained in more detail hereinafter.

Figure 4:
FIG. 4 is a schematic diagram illustrating an embodiment of a binary edge labeled string.

A subset of BELTs may be referred to, in this context, as binary edge labeled strings (BELSs). One embodiment, 400, is illustrated in FIG. 4. Thus, as illustrated by embodiment 400, this particular binary edge labeled string comprises four nodes and three edges, where the edges are labeled, respectively, binary zero, binary one and binary zero. Thus, a binary edge labeled string comprises a binary edge labeled tree in which each node has no more than two edges. To reiterate, in this context, a string comprises a binary edge labeled string and a tree comprises a binary edge labeled tree if each edge of the string or tree respectively stores a single bit. Likewise, in this context, two nodes are employed to support an edge holding a single piece of binary data. At this point, it is worth noting that strings and trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

As may be apparent by a comparison of FIG. 4 with, for example, FIG. 2 or FIG. 3, typically, a binary edge labeled tree has the ability to be richer and convey more data and/or more information than a binary edge labeled string. This may be observed, by a comparison of FIG. 4 with, for example, FIG. 2 or FIG. 3. Of course, depending on the particular tree and the particular string, there may be contrary examples, such as where the string is particularly large and the tree is particularly small. The aspect of BELTs to be richer in information may be one potential motivation to employ BELTs over BELSs, for example.

Despite the prior observation, as shall be described in more detail hereinafter, an association may be made between any particular binary edge labeled string and a binary edge labeled tree or vice-versa, that is, between any particular binary edge labeled tree and a binary edge labeled string. See, for example, U.S. provisional patent application Ser. No. 60/543,371, filed on Feb. 9, 2004, titled "Manipulating Sets of Hierarchical Data," assigned to the assignee of the presently claimed subject matter. In particular, an association may be constructed between binary edge labeled trees and binary edge labeled strings by enumerating in a consecutive order binary edge labeled strings and binary edge labeled trees, respectively, and associating the respectively enumerated strings and trees with natural numerals. Of course, many embodiments of associations between trees, whether or not BELTs, and strings, whether or not BELS, or between trees, whether or not BELTs, and natural numerals are possible. It is intended that the claimed subject matter include such embodiments, although the claimed subject matter is not limited in scope to the aforementioned provisional patent application or to employing any of the techniques described in the aforementioned provisional patent application.

Binary edge labeled trees may also be listed or enumerated. See, for example, previously cited U.S. provisional patent application Ser. No. 60/543,371. This is illustrated, here, for example, in FIG. 5. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in U.S. provisional patent application Ser. No. 60/543,371. U.S. provisional patent application Ser. No. 60/543,371 is provided simply as an example of listing or enumerating unordered BELTs. Thus, it is noted further that the BELTs described are unordered.

However, for this particular embodiment, although the claimed subject matter is not limited in scope in this respect, a method of enumerating a set of ordered trees may begin with enumeration of an empty binary edge labeled tree and a one node binary edge labeled tree. Thus, the empty tree is associated with the natural numeral zero and has a symbolic representation as illustrated in FIG. 5 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985. This may be illustrated, for example in FIG. 5, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

Figure 9:
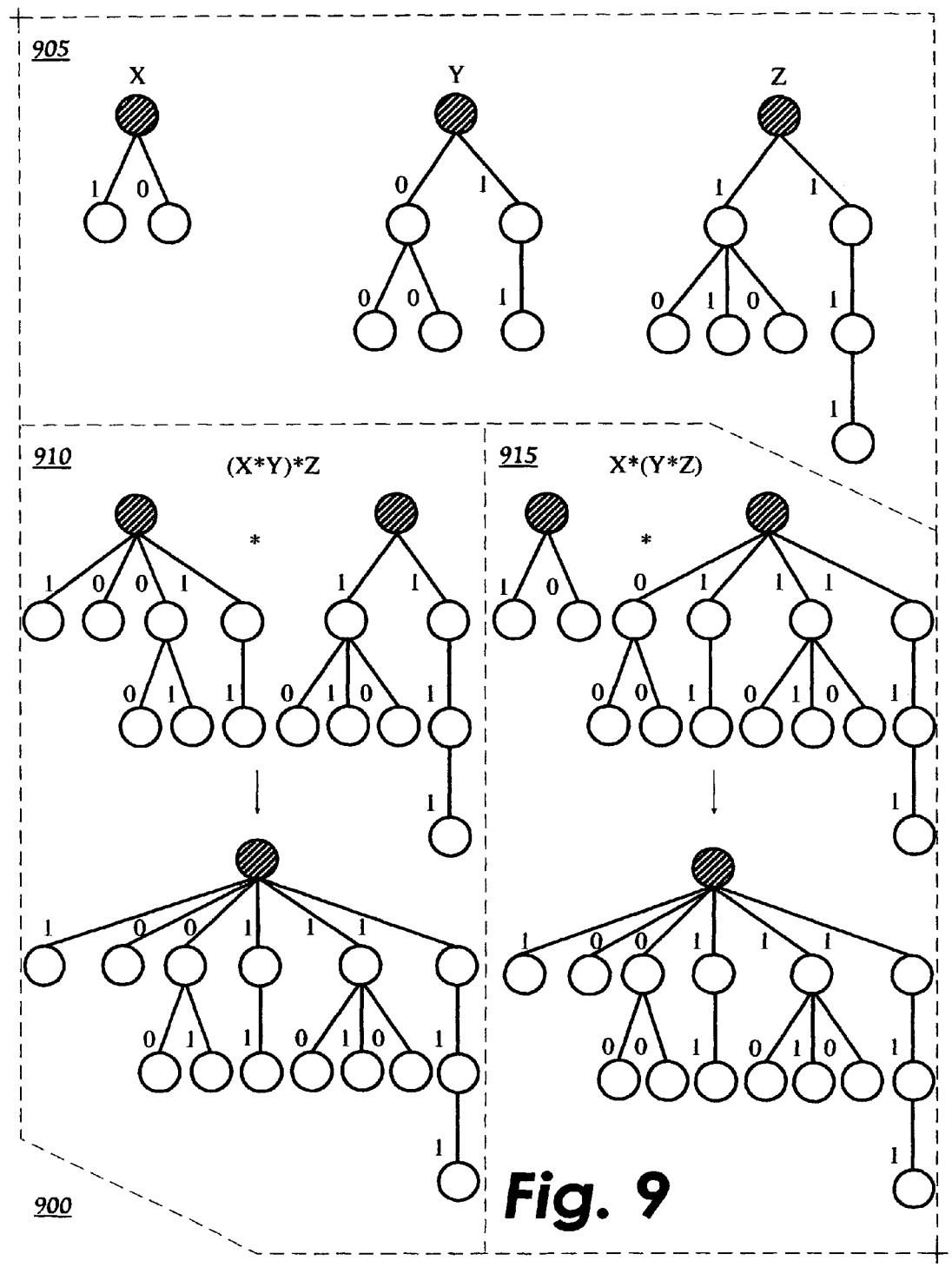
FIG. 9 is a schematic diagram illustrating an embodiment of an associative property applied to an embodiment of a merger operation and an embodiment of ordered binary edge labeled trees.

In this context, adding a root node and an edge and labeling it binary zero is referred to as a "zero-push" operation and adding a root node and an edge and labeling it binary one is referred to as a "one-push" operation. Thus, referring again to FIG. 5, the one-push of the root tree is the tree at position three. This follows from FIG. 9 of previously referenced U.S. provisional patent application Ser. No. 60/543,371, since P(2*1)=P(2)=3. Likewise, the tree at position five is the zero-push of the tree at position 2. Again, this follows from FIG. 9 of the previously referenced U.S. provisional patent application, since P(2*2−1)=P(3)=5.

In the embodiment just described, binary edge labeled trees use binary numerals "0" and "1." However, the claimed subject matter is not limited in scope to binary edge labeled trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc.

The foregoing discussion has begun to characterize an algebra involving trees, in this particular embodiment, an algebra for ordered binary edge labeled trees or ordered BELTs. The foregoing discussion, therefore, defines a value zero, a zero node tree for this particular embodiment, value one, a one node tree for this particular embodiment, and a monadic operation, previously described as zero-push. For this particular embodiment, the push operation shall also be referred to as the successor operation. For this particular embodiment, this shall be denoted as S(x), where x refers to the tree to which the successor operation is applied. Of course, the claimed subject matter is not limited in scope to the successor operation, S(x), being limited to a zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality.

Figure 8:
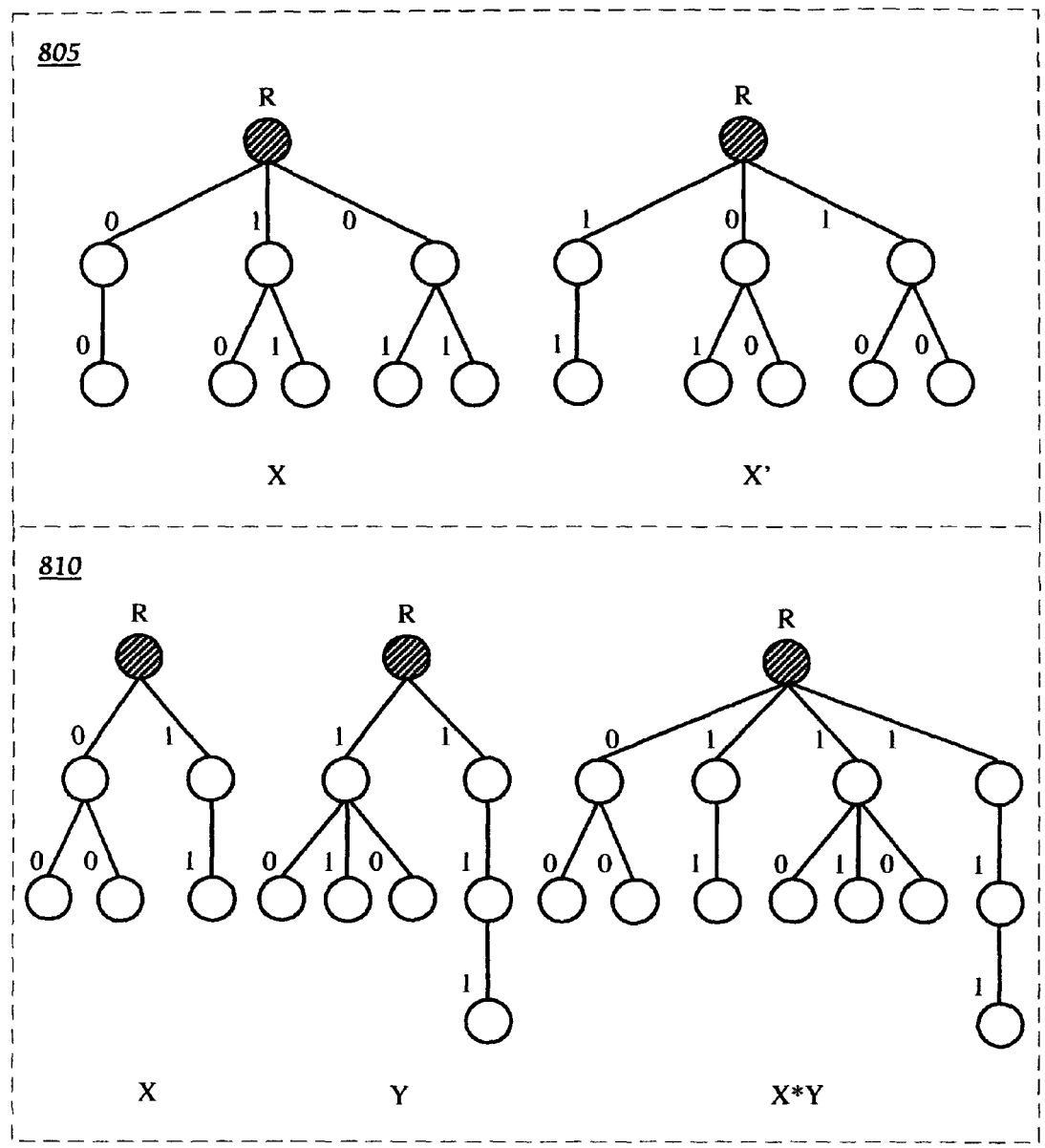
FIG. 8 is a schematic diagram illustrating an embodiment of an inversion operation and an embodiment of a merger operation applied to an embodiment of ordered binary edge labeled trees.

For this particular embodiment, two additional operations may be characterized, an "inversion" operation and a "merger" operation. For this particular embodiment, the inversion operation, when applied to a binary edge labeled tree, such as an ordered BELT, refers to replacing a "1" with a "0" and replacing a "0" with a "1". Likewise, the merger operation with respect to trees refers to merging two trees at their roots. These two operations are illustrated, for example, in FIG. 8.

As will now be appreciated, the inversion operation comprises a monadic operator while the merger operation comprises a binary operator. Likewise, the constants zero/one, referred to above, may be viewed as an operation having no argument or as a zero argument operator or operation. Thus, this operation, in effect, returns the same value whenever applied. Here, for this particular embodiment, the constant value zero, or zero argument operation that returns "0," is denoted as "c," the merger operator is denoted as "*", the inversion operation is denoted as "'", and the successor operator is denoted as previously described.

It may be shown that ordered binary edge labeled trees satisfy the following nine tree expressions referred to, for this particular embodiment, as the "basis expressions." Specifically, any combination of four operations on a set of objects that satisfy these nine basis expressions generates an isomorph of the ordered binary edge labeled trees under the operations described above.

$$x''=x; \quad (1)$$

$$((x*y)*z)=(x*(y*z)); \quad (2)$$

$$(c*x)=c; \quad (3)$$

$$(x*c)=c; \quad (4)$$

$$(S(c)*x)=x; \quad (5)$$

$$(x*S(c))=x; \quad (6)$$

$$c'=c; \quad (7)$$

$$S(c)'=S(c); \quad (8)$$

$$(x*y)'=(x'*y'). \quad (9)$$

Thus, examining these tree expressions, in turn, should provide insight into the properties of ordered BELTs. The first tree expression above demonstrates that applying the inversion operation successively to an object returns the original object, here an ordered binary edge labeled tree. The second tree expression above is referred to as the associative property. This property with respect to ordered binary edge labeled trees is demonstrated, for example, in FIG. 9.

As previously described, for this particular embodiment, the zero tree is denoted by the constant "c." Thus, as illustrated, in tree expressions (3) and (4), the merger of the zero tree with any other ordered BELT produces the zero tree. Likewise, the successor of the zero tree is the one tree or one node tree, also referred to here also as the unity tree. As illustrated by tree expressions (5) and (6), a merger of the unity tree with any other ordered BELT produces the ordered BELT. Likewise, as demonstrated by these tree expressions, changing the order of the merger does not change the result for either the zero tree or the unity tree.

Tree expressions (7) and (8) demonstrate that the inverse or inversion of the zero tree and the inverse or inversion of the unity tree in each respective case produces the same tree. Likewise, the final tree expression above, (9), demonstrates the distributive property for the inversion operation over the merger operation. Thus, the inverse of the merger of two ordered BELTs provides the same result as the merger of the inverses of the respective ordered BELTs. In this context, any set of tree expressions, such as the nine basis tree expressions, may be thought of a symmetric set of "re-write rules" with the tree expression on the left-hand side of an equality sign being replaced by the tree expression on the right-hand side of the equality sign or vice-versa.

One additional aspect of the foregoing basis relationships that was omitted from this embodiment, but that might be included in alternate embodiments, is the addition of a second monadic operator, denoted here as "T(x)." This particular operator is omitted here without loss of generality at least in part because it may be defined in terms of operators previously described. More particularly, T(x)=S (x')', may be included in alternate embodiments. This approach, though not necessary from an implementation perspective, may add some symmetry and elegance to the above basis relationships. For example, it may be demonstrated that S(x)'=T(x') and S(x')=T(x)'. In some respects, this relationship is analogous to the relationship between the logical operations OR and AND in Boolean algebra, where −(A AND B)=−A OR −B, and −(A OR B)=−A AND −B. However, as indicated above, this may be omitted without loss of generality and, therefore, for implementation purposes, it may be easier to implement four operators rather than five.

As is well-known and straight-forward, a set of rewrite rules defines an equivalence relationship if and only if the rewrite rules are reflexive, symmetric and transitive. Likewise, as follows from another well-known mathematical theorem concerning such reflexive, symmetric, and transitive relations, see, for example, Theorem 16.3 on page 65 of *An Introduction to Modern Algebra and Matrix Theory*, by Ross A. Beaumant and Richard W. Ball, available from Rhinehart and Co., NY, 1954, such a set of rewrite rules divides the ground terms of the associated algebra, here binary edge labeled trees with no variables, into disjoint equivalence classes that may be viewed as elements of a model of the tree expressions. The operations indicated and/or implied by the tree expressions, therefore, are interpreted as operations applied to one or more equivalence classes to produce an equivalence class. For example, in the case of the binary operation merger, to know the equivalence class of the result of a merger, a representative ordered BELT is selected from a first equivalence class, a representative is selected from a second equivalence class and the representatives are combined. The product of a merger operation, in this embodiment, is the equivalence class associated with the merger of the representatives. A similar approach may be likewise applied to the previously described monadic operations.

As previously suggested, a set of operations that satisfies the nine basis tree expressions previously described is isomorphic to the set of finite, rooted, ordered binary edge labeled trees. Thus, or more particularly, there is a one-to-one relationship between the equivalence classes that satisfy the nine tree expressions and the finite, rooted, ordered binary edge labeled trees. In this particular embodiment, this algebra includes the zero tree, denoted c, the unity tree, denoted S(c), the monadic operator of inversion, denoted ' (apostrophe), the monadic operator of succession, denoted S(x), and the binary operator of merger, denoted * (asterisk).

Figure 10A:
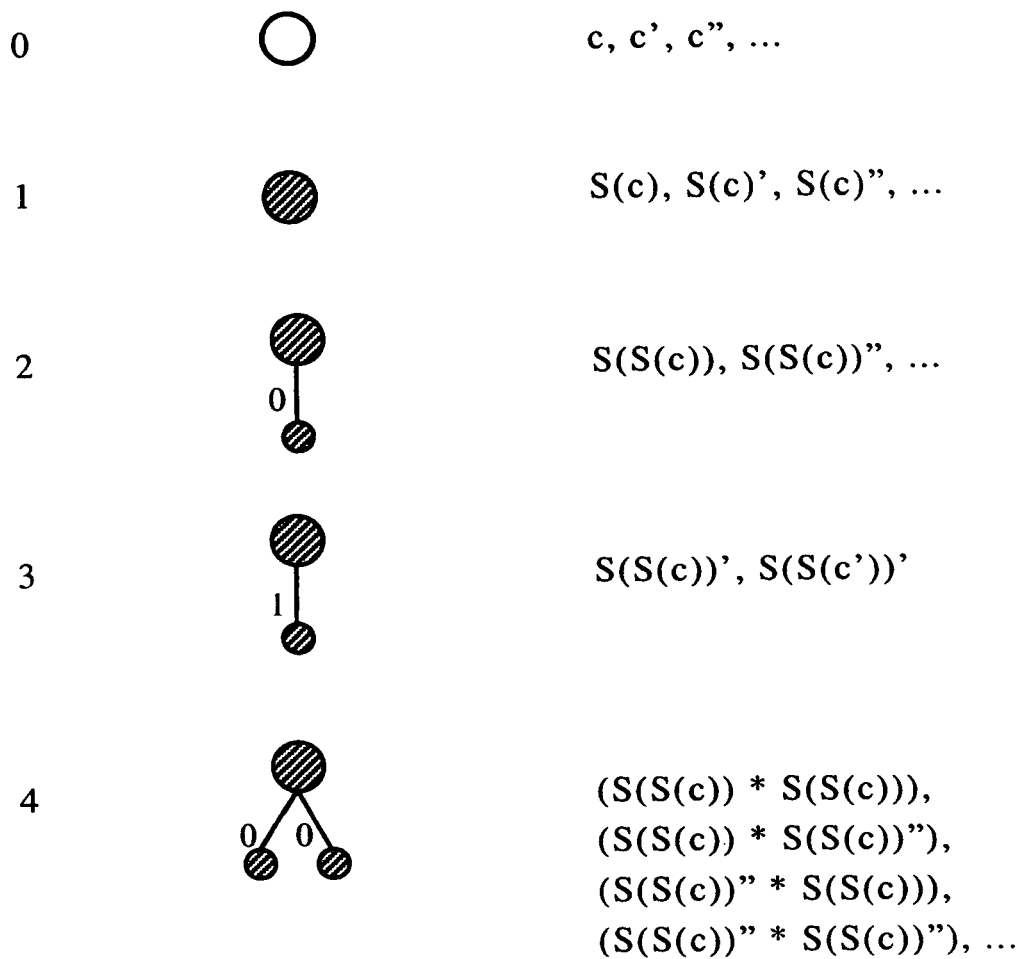
FIGS. 10a and 10b are schematic diagrams illustrating an embodiment of example elements of the first few equivalence classes for embodiments of ordered binary edge labeled trees.
Figure 10B:
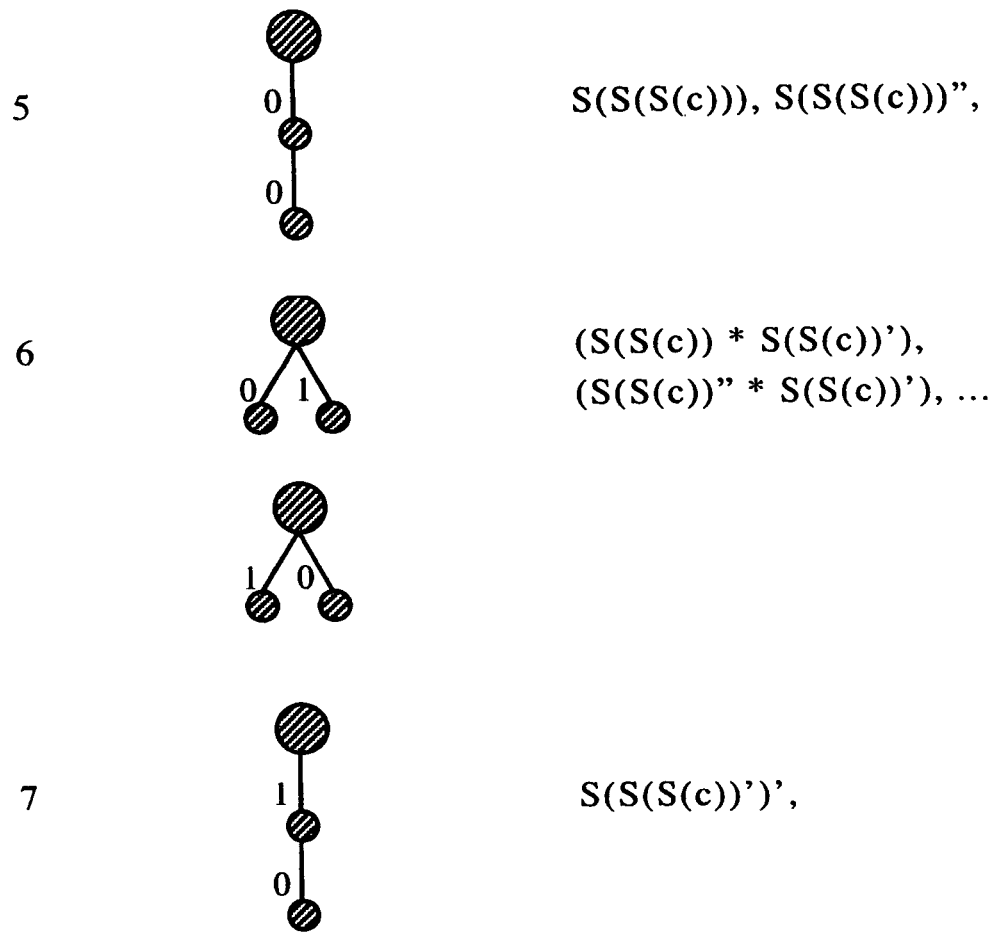

For this particular embodiment, to illustrate the concept of equivalence classes, FIGS. 10a and 10b provide the first few finite, rooted, ordered binary edge labeled trees with a few members of the equivalence class of terms associated with those trees. Thus, for this particular embodiment, in this context, a specific ordered binary edge labeled tree may constitute an equivalence class.

Of course, as previously alluded to, for this particular embodiment, a useful distinction is also made between an ordered binary edge labeled tree and an unordered binary edge labeled tree. In this context, and as previously suggested, the notion of "ordered" refers to the property that the nodes attached to a particular node form an ordered set, the order corresponding to the order in which those nodes are displayed in the graph of the tree. However, it may likewise be observed that two ordered trees are resident in the same equivalence class of unordered BELTs if and only if the two trees are commutative translates of each other. In other the words, the two trees are equivalent and in the same unordered BELT equivalence class where the trees differ only in the order of the attached nodes. This prior observation demonstrates that by adding a tenth tree expression as follows:

$$(x*y)=(y*x). \quad (10a)$$

referred to here as commutativity, the nine basis tree expressions, plus the tree expression above, form a model or algebra that is isomorphic to the unordered binary edge labeled trees. In a similar fashion, if, instead, the tenth tree expression is the following expression:

$$S(x*y)=S(x)*y \quad (10b)$$

referred to here as linearity, alternately, an algebra of objects that satisfies such ten tree expressions is isomorphic to the four operations applied to the set of finite binary edge labeled strings. See, for example, previously referenced U.S. provisional patent application 60/543,371.

The power of the observations made above, as shall become more clear hereinafter, is that by applying the nine basis tree expressions, it shall be possible, through repetitive application of algebraic manipulations, to simplify and, in some cases, solve a tree expression in ordered binary edge labeled. Likewise, in a similar fashion a similar proposition may be made and a similar process may be applied using a set of basis expressions to simplify tree expressions for unordered binary edge labeled trees and/or to simplify string expressions for finite binary edge labeled strings.

As shall be demonstrated below, by employing the nine basis tree expressions, in the case of ordered BELTs, and eight basis tree expressions in the case of unordered BELTs or BELS, it may be possible to derive a mechanism for simplifying any expression in the four previously described operators, regardless of complexity. For this particular embodiment, for example, regarding ordered BELTs, the approach employed is to match all possible single term expressions for ordered trees on the left-hand side of an equality with all possible single term expressions for ordered trees on the right-hand side of the equality. Any tree expression to be simplified comprises a combination of such delineated possible single term tree expressions. Therefore, for this particular embodiment, to simplify or reduce a tree expression, a set of algebraic manipulations may be repetitively applied to reduce or simplify a tree expression into a set of interrelated queries, in this particular embodiment, queries interrelated by Boolean operations, as illustrated below.

Although the claimed subject matter is not limited in scope in this respect, one technique for implementing this approach may be to apply a table look up approach. Therefore, the table may contain the single term tree expressions discussed above and illustrated in more detail below. Thus, when confronted with a tree expression to be simplified or reduced, table look ups may be applied repetitively to reduce a tree expression until it is simplified to a point where it may not be reduced or simplified further by applying such algebraic manipulations. Once this has been accomplished, the set of queries that has resulted may then be applied to one or more tree objects to produce a result that makes the original or initial tree expression true. Likewise, alternatively, this approach may ultimately indicate that no such tree expression is possible.

Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover such embodiments.

The following algebraic manipulation examples, numbered zero through forty-six below, delineate the extent of the possibilities of single term tree expressions and their simplification to accomplish the result described above for this particular embodiment. What follows is a listing of these forty seven expressions to demonstrate a technique for applying algebraic manipulations that take a given tree expression and return a simpler form. Of course, for some embodiments, such as a table look-up, it may be desirable to omit from such a table look up those expressions that are "always" and/or "never" true, such as c=c and/or c=S(c), respectively, for example. It is, of course, understood here that terms such as "always," "never," "if and only if" (iff) and the like, are limited in context to the particular embodiment.

Example 0

$$c=c$$

This is a logical truth.

Example 1

$$c=x$$

This is true iff x=c.

Example 2

$$c=S(x)$$

This is true nowhere because c is never equal to S(x), for any x, in this embodiment.

Example 3

$$c=x'$$

This is true iff c=x. This may be shown by the following argument:
c=x' iff c'=x" iff c'=x iff c=x.

Example 4

$$c=(x*y)$$

This is true iff x=c or y=c.

The examples above have c on the left-hand side with all other syntactic variations on the right-hand side. Next are cases where the left-hand side is x. In these cases, the right hand side is assumed to be something other than c because this case was addressed above.

Example 5

$$x=x$$

This is a logical validity and true everywhere.

Example 6

$$x=y$$

This is true iff x=y.

Example 7

$$x=S(x).$$

This is never true.

Example 8

$$x=S(y)$$

This is true iff x=S(y).

Example 9

$$x=x'$$

This is true iff x=c or x=S(c).

Example 10

$$x=y'$$

This is true iff x=y' or y=x'.

Next are the cases where the term on the right is a merger, *, of two simpler terms.

Example 11

$$x=(x*x)$$

This is true iff x=c or x=S(c).

Example 12

$$x=(x*y)$$

This is true iff x=c or y=S(c).

Example 13

$$x=(y*x)$$

This is true iff x=c or y=S(c).

Example 14

$$x=(y*Z)$$

This is true iff x can be decomposed into two parts connected by the * operation where y is the first part of the decomposition and z is the remainder. The number of possible terms that y might be for this to be true is found by seeing x as an ordered multiple product and letting y be the initial product of any number of these terms. Thus, this statement is true iff the disjunction that lists all possible ways of assigning y to an initial product of the parts and assigning z to the remaining parts is true. The last term in this disjunction assigns y to x and S(c) to z.

Next are cases where the left-hand side is S(x) or S(x').

Example 15

$S(x)=S(x)$

This is always true.

Example 16

$S(x)=S(y)$

This is true iff x=y.

Here, by way of illustration, a more complex equation is reduced to a simpler equation. In general, as previously suggested, for this particular embodiment, reducing a complex expression to a possible Boolean combination of simpler expressions provides a mechanism to determine conditions that make the tree expression true.

Example 17

$S(x)=x'$

This is never true.

Example 18

$S(x)=y'$

This is true iff (x=c and y=S(c)) or y=S(x)'.

Example 19

$S(x)=(x*x)$

This is never true.

Example 20

$S(x)=(x*y)$

This equation is true iff x=S(c) and y=S(S(c)).

Example 21

$S(x)=(y*x)$

This is solvable iff x=S(c) and y=S(S(c)).

Example 22

$S(x)=(y*z)$

This equation is solvable iff either (a) (y=S(c) and z=S(x)) or
(b) (z=S(c) and y=S(x)).

Example 23

$S(x')=(x*x)$

This equation is never true.

Example 24

$S(x')=(y*y)$

This equation is true iff x=c and y=S(c).

Example 25

$S(x')=(x*y)$

This is true iff x=S(c) and y=S(S(c)).

Example 26

$S(x')=(y*x)$

This is true iff x=S(c) and y=S(S(c)).

Example 27

$S(x')=(y*z)$

This is solvable iff
((x=c and y=S(c)) and z=S(c)) or
(x=S(c) and ((y=S(c) and z=S(S(c))) or (z=S(c) and y=S(S(c))))).

Next are the cases where the left-hand side is x'.

Example 28

$x'=x'$

This is always true.

Example 29

$x'=y'$

This is true iff x=y.

Example 30

$x=(x*x)$

This is true iff x=c or x=S(c).

Example 31

$x=(x*y)$

This is true iff x=c or (x=S(c) and y=S(c)).

Example 32

$x'=(y*x)$

This is true iff x=c or (x=S(c) and y=S(c)).

Example 33

$x'=(y*z)$

This is solvable iff $x=(y'*z')$ which is solvable iff
- [y=c and x=c] or
- [y=S(c) and z=x'] or
- [z=c and x=c] or
- [z=S(c) and y=x'] or
- x can be decomposed into (y'*z').

Example 34

$$S(x)'=(x*x)$$

This equation is never true.

Example 35

$$S(x)'=(y*y)$$

This equation is true iff x=c and y=S(c).

Example 36

$$S(x)'=(x*y)$$

This is true iff x=S(c) and y=S(S(c))'.

Example 37

$$S(x)'=(y*x)$$

This is true iff x=S(c) and y=S(S(c))'.

Example 38

$$S(x)'=(y*z)$$

This is solvable iff $S(x)=(y'*z')$ which is solvable iff
- [y=S(c) and z=S(x)] or
- [z=S(c) and y=S(x)].

The remaining cases are where the left-hand side is a merger operation.

Example 39

$$(x*x)=(x*x)$$

This is always true.

Example 40

$$(x*x)=(y*y)$$

True iff x=y.

Example 41

$$(x*x)=(x*y)$$

True iff x=y.

Example 42

$$(x*x)=(y*x)$$

True iff x=u.

Example 43

$$(x*x)=(u*v)$$

This is solvable iff
(a) (x=c and (u=c or v=c)); or
(b) (x=S(c) and (u=S(c) and v=S(c)); or
(c) there exists terms $x_1, x_2, v_1, v_2$ such that $x=(x_1*x_2)$, $v=(v_1*v_2)$ and $x_1=u$ and $x=v_2$; or
(d) there exists terms $u_1, u_2, x_1, x_2$ such that $u=(u_1*u_2)$, $x=(x_1*x_2)$, $x=u_1$ and $x_2=v$; or
(e) x=u and y=v.

Example 44

$$(x*y)=(x*v)$$

True iff x=c or (y=c and v=c) or y=v.

Example 45

$$(x*y)=(u*x)$$

True iff x=c or (y=c and u=c) or y=u.

Example 46

$$(x*y)=(u*v)$$

This is solvable iff
(a) (x=c and (u=c or v=c)); or
(b) (x=S(c) and (u=S(c) and v=S(c)); or
(c) there exists terms $x_1, x_2, v_1, v_2$ such that $x=(x_1*x_2)$, $v=(v_1*v_2)$ and $x_1=u$ and $x=v_2$; or
(d) there exists terms $u_1, u_2, x_1, x_2$ such that $u=(u_1*u_2)$, $x=(x_1*x_2)$, $x=u_1$ and $x_2=v$; or
(e) x=u and y=v.

Previously described is an embodiment of a method or technique for reducing or simplifying a tree expression to obtain a result that provides the condition(s) under which the tree expression is true. For example, if the left-hand side is a tree expression in x and the right-hand side is a tree expression in ground terms, this may reduce to another tree expression that makes the overall initial tree expression true. Of course, the claimed subject matter is not limited in scope to only this particular embodiment.

Another embodiment of a method or technique for reducing or simplifying a tree expression may involve segregating simplification with the basis relationships from simplifying using the 47 expressions provided above. For example, from an implementation perspective, it may simplify results to apply the basis expressions before applying the 47 derived expressions. In one particular embodiment, although, of course, the claimed subject matter is not limited in scope in this respect, the basis expressions may be applied in the following specific order to simplify the given tree expression:

$$x''=x; \tag{1}$$

$$(x*y)=(x'*y'); \tag{9}$$

$$x''=x; \tag{1}$$

$$c'=c; \tag{7}$$

$$(c*x)=c; \tag{3}$$

$$(x*c)=c; \tag{4}$$

$$S(c)'=S(c); \tag{8}$$

$$(S(c)*x)=x;\quad(5)$$

$$(x*S(c)))=x;\quad(6)$$

$$((x*y)*z)=(x*(y*z)).\quad(2)$$

Once the tree expression has been simplified using these basis expressions, the 47 derived expressions may be applied to further reduce or simplify the tree expression. Of course, again, this is merely one possible approach and the claimed subject matter is not limited in scope to this particular embodiment.

Embodiments of a method of reducing or simplifying tree expressions have a variety of potentially useful applications. As described previously, trees provide a technique for structuring and/or depicting hierarchical data. Thus, for example, trees may be employed to represent language sentence structures, computer programs, algebraic formulae, molecular structures, family relationships and more. For example, one potential application of such a tree reduction technique is in the area of pattern matching. Thus, in pattern matching, substructures, in the form of a tree, for example, may be located within a larger structure, also in the form of a tree, referred to in this context as the target. This may be accomplished by comparing the structures; however, typically, such a comparison is complex, cumbersome, and/or time consuming. Although the claimed subject matter is not limited in scope to pattern matching or to any of the other potential applications described above, it may be instructive to work through at least one particular example of applying the previously described tree reduction approach to a pattern matching problem to demonstrate the power and/or versatility of this particular embodiment.

Within this particular context and for this particular embodiment, there are a number of potential pattern matching inquiries that may be made. Although these are simply examples and the claimed subject matter is not limited in scope to only these particular inquiries, one such inquiry, for example, may be whether a first tree, such as an ordered binary edge labeled tree, is equal to a second binary edge labeled tree? To phrase this differently, it may be useful to determine whether the trees match exactly. Likewise, another such query, or active verb, may be referred to in this context as a rooted partial sub tree (RPS) query or inquiry. This particular type of query or inquiry is demonstrated with reference to FIG. 11.

Thus, in Examples 1 and 2 of FIG. 11, the right-hand sides depict a binary edge labeled tree for the numeral 60543371. See, for example, the previously referenced U.S. provisional patent application 60/543,371. Here, in Example 1, the left-hand side of FIG. 11 provides a rooted partial subtree of the right-hand side. In this context, the term rooted refers to a comparison in which the roots of the left-hand side and the right-hand side are matched or compared. The notion of a partial subtree is to be distinguished from the notion of a full subtree. In this context, therefore, a rooted full subtree refers to the equality described above. Likewise, then, a rooted partial subtree refers to a match with another tree, but only to the extent of the nodes and edges present for the rooted partial subtree. Thus, the target may contain additional nodes, edges, and/or labels that are omitted from the rooted partial subtree. By way of contrast, Example 2 demonstrates on the left-hand side a tree that is not a rooted partial subtree of the right-hand side tree, although the left-hand side tree has the same arrangement of nodes and edges as a rooted partial subtree of the right-hand side. Thus, another type of match may occur where the arrangement of the nodes and edges match, but the labels do not match, as in Example 2.

One query or question to be posed, for the purposes of pattern matching, is whether the tree on the left-hand side, such as in example one, is a rooted partial subtree of the tree on the right-hand side. In addition to that, several other potential questions may be posed and potentially answered. For example, if the tree on the left-hand side is a rooted partial subtree of the tree on the right-hand side, it may be useful to know how many times this rooted partial subtree is present in the right-hand side tree. Likewise, assume that a rooted partial subtree is present more than once. It may be useful to have a mechanism to identify one of the several rooted partial subtrees to a machine, for example, for further processing.

It also may be desirable, in other circumstances, to determine whether there is a match between a rooted tree and a subtree that is not rooted. In this context this may be referred to, for example, as a "projected match". In this context, this refers to projecting one tree into another tree without matching corresponding roots and having the form and labels of the projected tree still be preserved in the tree in which it is projected.

Likewise, with reference to Example 2, in which the tree on the left-hand side does not match the tree on the right-hand side, an alternative query or question may relate to a measurement of the similarities and/or differences, as an embodiment of a measurement of the matching. For example, particular branches of the tree on the left-hand side may match with particular branches of the tree on the right-hand side, although overall, the entire tree on the left-hand side may not match to a subportion of the tree on the right-hand side, in this particular example. Thus, it may be appropriate, for example, to weight the matching in some form. Such an approach, for example, might be employed in data analysis, as simply one example. In one embodiment, for example, it may be desirable to identify a partial match that results in the maximum number of matching nodes and edges; likewise, in a different embodiment, it may be desirable to identify a partial match such that the match is closest to or most remote from the root. Again, any one of a number of other approaches is possible and such approaches included within the scope of the claimed subject matter. Thus, it may be desirable, assuming there is no identical match, to identify the closest match where "closest" or "most remote" is defined with respect to a particular weighted criterion designed to achieve a particular objective, such as the examples previously described.

For this particular embodiment, as previously suggested, a method of performing pattern matching may include constructing a tree expression. A tree expression may be constructed in a manner so as to match a first pattern, represented as a first tree, with or against a second pattern, represented as a second tree. After such a tree expression has been formulated or constructed, the conditions under which the tree expression is true may be determined. This may be accomplished, for example, by applying the previously described techniques for simplifying or reducing tree expressions. Likewise, as previously suggested, alternatively, such an approach may determine the conditions under which the formulated or constructed tree expression is false rather than true.

Figure 12:
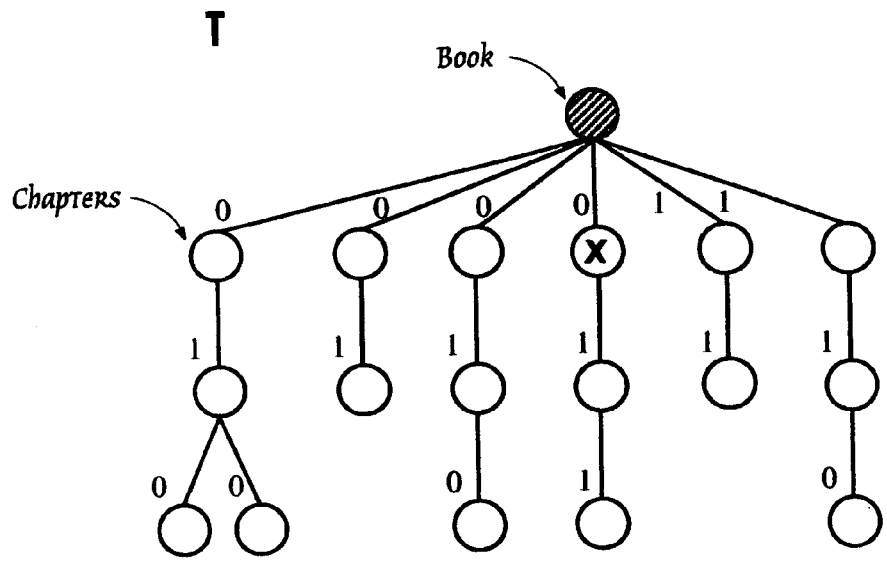
FIG. 12 is a schematic diagram illustrating an embodiment of a sample pattern matching problem using embodiments of ordered binary edge labeled trees.

In order to appreciate the power and/or versatility of this particular application, a simple example is desirable. Therefore, FIG. 12 is a schematic diagram illustrating one example embodiment 1200 of an ordered binary edge labeled tree. This particular tree has a root that is designated as "book." This tree, designated as T in FIG. 12, might, for example, comprise a partial subtree of a larger tree referred to as "library," where library is a forest of trees representing various books.

Continuing with this example, emanating from the root node "book" are five edges, three of them labeled with a "0" and two of them labeled with a "1". For this particular embodiment, a "0" designates chapters of the book, whereas a "1" designates appendices of the book. Each edge includes another node other than the root node to support the edge that is labeled as just described. Likewise, as illustrated in FIG. 12, each of the chapters and appendices has attached to that node, one or more additional edges and nodes. These additional edges and nodes, in this particular embodiment, designate the particular numerical designation of the particular chapter or appendix. Thus, in FIG. 12, chapters one, two and three and appendices one and two are illustrated. For example, in a database, this tree may operate as a pointer to designate the location in memory of these particular chapters and appendices. It may, thus, be desirable, for example, to retrieve a particular chapter of "book" from storage.

FIGS. 10a and 10b provide a short list of ordered binary edge labeled trees corresponding to several natural numerals. Thus, by way of comparison between FIGS. 10a and 10b, and FIG. 12, it should be clear which nodes and edges designate chapters one to three and appendices one and two. The tree expression also shown in FIG. 12, therefore, is intended to demonstrate the application of algebraic manipulations to perform tree expression simplification in order to accomplish pattern matching, such as previously described.

The simplification may be accomplished as follows. The tree expression, $S(x)<=(R)\ y$, where "<=" denotes "partial rooted subtree of," indicates that the successor of tree x is a rooted partial subtree of the tree, T, in which book is a root node. The second half of the tree expression above comprises a tree equation in x. Thus, the expression $(S(x)<=(R)\ y)$ may be reduced by simplifying the expression $S(x)$ in the manner previously described above, for example. Likewise, simplifying the expression $(y=S(S(c))')$ involves several successive simplification operations involving the inverse operation and applying the successor operation. Again, as previously discussed, this may be accomplished through application of a table look up technique. As previously explained, a complex tree expression may therefore be reduced into simpler tree expressions that are interrelated by Boolean logic. This is demonstrated, for example, through the simplification of tree expressions as illustrated in Examples 0 to 46 above for ordered trees. Thus, in this example, these simplified tree expressions comprise queries interrelated by Boolean operations.

Furthermore, to apply such queries such as, for example, determining whether a first tree is a rooted partial subtree of another tree, as indicated by the tree expression above, involves the application of known programming techniques. See, for example, Chapter 4, "Tree Isomorphism," of *Algorithms on Trees and Graphs*, by Gabriel Valiente, published by Springer, 2002. Such well-known and well-understood programming techniques will not be discussed here in any detail.

Much of the prior discussion was provided in the context of ordered binary edge labeled trees. However, a similar approach may be applied to unordered binary edge labeled trees, for example. In general, it is understood that performing such simplifications or reductions to unordered BELTs presents more of a processing challenge. See, for example, "Tree Matching Problems with Applications to Structured Text Databases," by Pekka Kilpelainen, Ph.D dissertation, Department of Computer Science, University of Helsinki, Finland, November, 1992. A potential reason may be that a greater number of possibilities are present combinatorially in those situations in which nodes may be unordered rather than ordered. Nonetheless, to address such unordered trees, as previously for ordered trees, we begin with the basis expressions. More specifically, a set of basis expressions may be isomorphic to applying the four previously described operations, to unordered BELTs. Here, there are eight basis expressions rather than nine.

$$x''=x; \qquad (1)$$

$$((x*y)*z)=(x*(y*z)); \qquad (2)$$

$$(c*x)=c; \qquad (3)$$

$$(S(c)*x)=x; \qquad (4)$$

$$c'=c; \qquad (5)$$

$$S(c)'=S(c); \qquad (6)$$

$$(x*y)'=(x'*y'); \qquad (7)$$

$$(x*y)=(y*x). \qquad (8)$$

It is worth observing that expressions (4) and (6) from the previous set of expressions have been omitted here. Such expressions are redundant in light of expression (8) above, which has been added. As previously, then, these expressions may be employed to solve single term expression that may be employed through a table look-up process, for example, to simplify more complex tree expressions. As previously, the tree expressions are provided below. Again, "never," "always," "iff" and the like are limited in context to the particular embodiment.

Example 0

$c=c$

This is a logical truth.

Example 1

$c=x$

This is true iff x=c.

Example 2

$c=S(x)$

This is true nowhere because c is never equal to S(x), for any x, in this embodiment.

Example 3

$c=x'$

This is true iff c=x. This may be shown by the following argument:
c=x' iff c'=x" iff c'=x iff c=x.

Example 4

$c=(x*y)$

This is true iff x=c or y=c.

Example 5

$$x = x$$

This is a logical validity and true everywhere.

Example 6

$$x = y$$

This is true iff x=y.

Example 7

$$x = S(x).$$

This is never true.

Example 8

$$x = S(y)$$

This is true iff x=S(y).

Example 9

$$x = x'$$

This is true iff x=c or x=S(c).

Example 10

$$x = y'$$

This is true iff x=y' or y=x'.

Example 11

$$x = (x*x)$$

This is true iff x=c or x=S(c).

Example 12

$$x = (x*y)$$

This is true iff x=c or y=S(c).

Example 13

$$x = (y*x)$$

This is true iff x=c or y=S(c).

Example 14

$$x = (y*Z)$$

This is true iff x can be decomposed into two parts connected by the * operation where y is the first part of the decomposition and z is the remainder. The number of possible terms that y might be for this to be true is found by seeing x as an unordered multiple product and letting y be the initial product of any number of these terms. Thus, this statement is true iff the disjunction that lists all possible ways of assigning y to an initial product of the parts and assigning z to the remaining parts is true. The last term in this disjunction assigns y to x and S(c) to z.

Next are cases where the left-hand side is S(x) or S(x').

Example 15

$$S(x) = S(x)$$

This is always true.

Example 16

$$S(x) = S(y)$$

This is true iff x=y.

Here, by way of illustration, a more complex equation is reduced to a simpler equation. In general, as previously suggested, for this particular embodiment, reducing a complex expression to a possible Boolean combination of simpler expressions provides a mechanism to determine conditions that make the tree expression true.

Example 17

$$S(x) = x'$$

This is never true.

Example 18

$$S(x) = y'$$

This is true iff (x=c and y=S(c)) or y=S(x)'.

Example 19

$$S(x) = (x*x)$$

This is never true.

Example 20

$$S(x) = (x*y)$$

This equation is true iff x=S(c) and y=S(S(c)).

Example 21

$$S(x) = (y*x)$$

This is solvable iff x=S(c) and y=S(S(c)).

Example 22

$$S(x) = (y*z)$$

This equation is solvable iff either (a) (y=S(c) and z=S(x)) or
(c) (z=S(c) and y=S(x)).

Example 23

$$S(x') = (x*x)$$

This equation is never true.

Example 24

$$S(x') = (y*y)$$

This equation is true iff x=c and y=S(c).

Example 25

$$S(x')=(x*y)$$

This is true iff x=S(c) and y=S(S(c)).

Example 26

$$S(x')=(y*x)$$

This is true iff x=S(c) and y=S(S(c)).

Example 27

$$S(x')=(y*z)$$

This is solvable iff
((x=c and y=S(c)) and z=S(c)) or
(x=S(c) and ((y=S(c) and z=S(S(c)) or (z=S(c) and y=S(S(c))))).
Next are the cases where the left-hand side is x'.

Example 28

$$x'=x'$$

This is always true.

Example 29

$$x'=y'$$

This is true iff x=y.

Example 30

$$x'=(x*x)$$

This is true iff x=c or x=S(c).

Example 31

$$x=(x*y)$$

This is true iff x=c or (x=S(c) and y=S(c)).

Example 32

$$x=(y*x)$$

This is true iff x=c or (x=S(c) and y=S(c)).

Example 33

$$x_1=(y*z)$$

This is solvable iff either
 (x=c and (y=c or z=c)); or
 (x=S(c) and y=S(c) and z=S(c)); or
 (x=(y'*z')); or
 (x=(z'*y))

Example 34

$$S(x)'=(x*x)$$

This equation is never true.

Example 35

$$S(x)'=(y*y)$$

This equation is true iff x=c and y=S(c).

Example 36

$$S(x)'=(x*y)$$

This is true iff x=S(c) and y=S(S(c))'.

Example 37

$$S(x)'=(y*x)$$

This is true iff x=S(c) and y=S(S(c))'.

Example 38

$$S(x)'=(y*z)$$

This is solvable iff S(x)=(y'*z') which is solvable iff
 [y=S(c) and z=S(x)] or
 [z=S(c) and y=S(x)].

Example 39

$$(x*x)=(x*x)$$

This is always true.

Example 40

$$(x*x)=(y*y)$$

True iff x=y.

Example 41

$$(x*x)=(x*v)$$

True iff x=v.

Example 42

$$(x*x)=(u*x)$$

True iff x=u.

Example 43

$$(x*x)=(u*v)$$

This is solvable iff
 (d) (x=c and (u=c or v=c)); or
 (e) (x=S(c) and (u=S(c) and v=S(c))); or
 (f) there exists terms $x_1$, $x_2$, $v_1$, $v_2$ such that x=($x_1$*$x_2$), v=($v_1$*$v_2$) and $x_1$=u and $x_2$=v; or
 (f) there exists terms $u_1$, $u_2$, $x_1$, $x_2$ such that u=($u_1$*$u_2$), x=($x_1$*$x_2$), $x$=$u_1$ and $x_2$=v; or
 (g) x=u and y=v.

Example 44

$$(x*y)=(x*v)$$

True iff y=v.

Example 45

$$(x*y)=(u*y)$$

True iff x=u.

Example 46

$$(x*y)=(u*v)$$

This is solvable iff
- (g) (x=c and (u=c or v=c)); or
- (h) (y=c and (u=c or v=c)); or
- (i) (x=S(c) and y=(u*v)); or
- (j) (y=S(c) and x=(u*v)); or
- (k) there exists terms $x_1$, $x_2$, $v_1$, $v_2$ such that $x=(x_1*x_2)$, $v=(v_1*v_2)$ and $x_1=u$ and $y=v_2$; or
- (f) there exists terms $u_1$, $u_2$, $y_1$, $y_2$ such that $u=(u_1*U_2)$, $y=(y_1*y_2)$, $x=u_1$ and $y_2=v$; or
- (g) x=u and y=v.

Thus, a similar process as previously described for ordered trees may be applied for unordered trees using the 47 expressions above.

Figure 6:
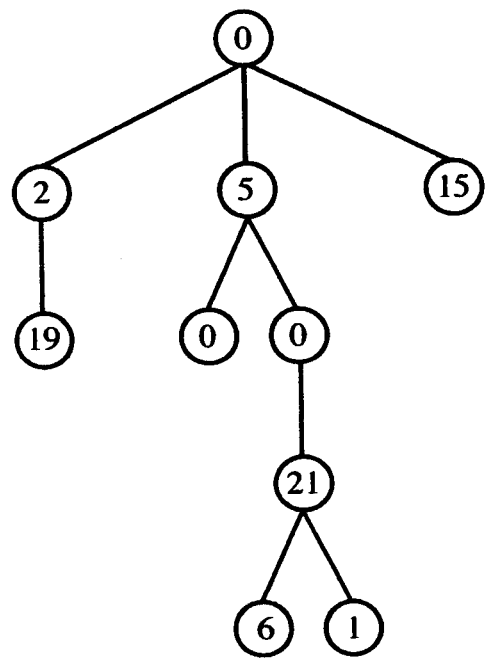
FIG. 6 is a schematic diagram of an embodiment of a binary node labeled tree.

Of course, the claimed subject matter is not limited to ordered or unordered binary edge labeled trees. For example, as described in previously cited U.S. provisional patent application 60/543,371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. This is illustrated, for example, in FIG. 6. Thus, rather than employing binary edge labeled trees, the previously described embodiments may alternatively be performed using binary node labeled trees. As one example embodiment, operations and/or manipulations may be employed using binary edge labeled trees and the resulting binary edge labeled tree may be converted to a binary node labeled tree. However, in another embodiment, operations and/or manipulations may be performed directly using binary node labeled trees where a different association embodiment is employed.

In accordance with the claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree and/or string, as described, for example in the previously referenced U.S. provisional patent application 60/543,371. For example, as described in the previously referenced U.S. provisional patent application, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values. However, for convenience, without intending to limit the scope of the claimed subject matter in any way, here, operations and/or manipulations and the like have been described primarily in the context of BELTs.

Figure 7:
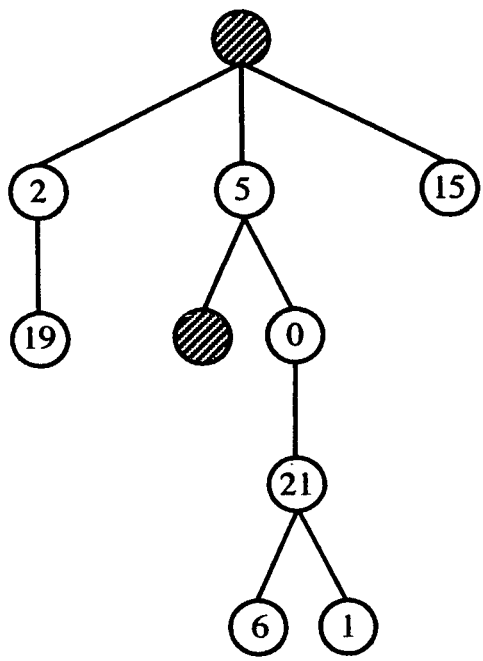
FIG. 7 is a schematic diagram illustrating another embodiment of a binary node labeled tree.

In another embodiment, however, a particular tree may include null types or, more particularly, some node values denoted by the empty set. This is illustrated, for example, by the tree in FIG. 7, although, of course, this is simply one example. Likewise, this example is an example of a binary node labeled tree with nulls, although, the claimed subject matter is not limited in scope in this respect. An advantage of employing null types includes the ability to address a broader array of hierarchical data sets. For example, without loss of generality and not intending to limit the scope of the claimed subject matter in any way, a null type permits representing in a database or a relational database, as two examples, situations where a particular attribute does not exist. As may be appreciated, this is different from a situation, for example, where a particular attribute may take on a numeral value of zero. Again, as described in the previously referenced U.S. provisional patent application 60/543, 371, a tree with nulls, as described above, may be converted to a tree without nulls; however, the claimed subject matter is not limited in scope in this respect, of course. Thus, it may be desirable to be able to address both situations when representing, operating upon, manipulating and/or searching for patterns regarding hierarchical sets of data.

Likewise, in an alternative embodiment, a node labeled tree, for example, may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be converted to a binary edge labeled tree and/or binary node labeled tree, and, for another embodiment, a tree in which edges are labeled with numerals or numerical data, rather than binary data, may be converted to a binary edge labeled tree and/or binary node labeled tree. See previously referenced U.S. provisional patent application Ser. No. 60/543,371.

Furthermore, a tree in which both the nodes and the edges are labeled may be referred to in this context as a feature tree and may be converted to a binary edge labeled tree and/or binary node labeled tree. For example, without intending to limit the scope of the claimed subject matter, in one approach, a feature tree may be converted by converting any labeled node with its labeled outgoing edge to an ordered pair of labels for the particular node. Using the embodiment described, for example in the previously referenced U.S. provisional patent application, this tree may then be converted to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to binary edge labeled trees, such as by applying the embodiment of the previously referenced U.S. provisional patent application, for example. However, again, this is provided for purposes of explanation and illustration. The claimed subject matter is not limited in scope to employing the approach of the previously referenced provisional patent application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and/or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of using pattern matching on a complex tree expression of a complex tree hierarchy, the method comprising:
forming another complex tree expression for a rooted partial subtree query using, at least in part, a plurality of operations usable for determining a one-to-one association between tree hierarchies and natural numerals;
forming the complex tree expression for the complex tree hierarchy using at least in part the plurality of operations usable for determining the one-to-one association between tree hierarchies and natural numerals;
reducing, using at least in part a plurality of algebraic expressions, the formed complex tree expression for the complex tree hierarchy into a plurality of interrelated portions; and
comparing the another complex tree expression for the rooted partial subtree query with the reduced plurality of interrelated portions for the complex tree expression.

2. The method of claim 1, wherein the plurality of operations comprise at least one of an inversion operation or a merger operation.

3. The method of claim 1, wherein the plurality of operations comprise at least one of a zero-push or a one-push operation.

4. The method of claim 3, wherein the zero-push operation comprises, at least in part, adding a child node and an edge to a parent node and labeling the added edge with a binary zero.

5. The method of claim 3, wherein the one-push operation comprises, at least in part, adding a child node and an edge to a parent node and labeling the added edge with a binary one.

6. The method of claim 1, wherein the plurality of interrelated portions comprise one or more queries.

7. The method of claim 6, wherein the one or more queries are interrelated by one or more Boolean operations.

8. The method of claim 1, wherein the plurality of algebraic expressions comprise one or more basis expressions.

9. The method of claim 1, wherein the complex tree hierarchy comprises an ordered tree hierarchy.

10. The method of claim 1, wherein the comparing the another complex tree expression for the rooted partial subtree query with the reduced plurality of interrelated portions for the complex tree expression comprises identifying at least one partial match, at least one match, or a combination thereof.

11. The method of claim 10 further comprising generating one or more matching portions from the reduced plurality of interrelated portions.

12. The method of claim 10 further comprising generating a Boolean true or false responsive to an identification of a match or a partial match between the another complex tree expression for the rooted partial subtree query and the reduced plurality of interrelated portions for the complex tree expression.

13. The method of claim 1 further comprising using, at least in part, one or more algebraic expressions on at least one of the plurality of interrelated portions to manipulate the complex tree hierarchy.

14. The method of claim 13, wherein to manipulate the complex tree hierarchy comprises merging the at least one of the plurality of interrelated portions with a portion of a second complex tree hierarchy.

15. An article comprising: a non-transitory storage medium, the storage medium having stored thereon instructions executable to:
form a complex tree expression for a complex tree hierarchy via use at least in part of a plurality of operations to determine a one-to-one association between tree hierarchies and natural numerals;
form another complex tree expression for a rooted partial subtree query using, at least in part, the plurality of operations usable to determine a one-to-one association between tree hierarchies and natural numerals;
reduce, via use at least in part of a plurality of algebraic expressions, the formed complex tree expression for the complex tree hierarchy into a plurality of interrelated portions; and
compare the another complex tree expression for the rooted partial subtree query with the reduced plurality of interrelated portions for the complex tree expression.

16. The article of claim 15, wherein the plurality of operations to comprise at least one of an inversion operation or a merger operation.

17. The article of claim 15, wherein the plurality of operations to comprise at least one of a zero-push or a one-push operation.

18. The article of claim 17, wherein the zero-push operation to comprise, at least in part, addition of a child node and an edge to a parent node and addition of a binary zero label to the edge.

19. The article of claim 17, wherein the one-push operation to comprise, at least in part, addition of a child node and an edge to a parent node and addition of a binary one label to the edge.

20. The article of claim 15, wherein the plurality of interrelated portions to comprise one or more queries.

21. The article of claim 20, wherein the one or more queries are to be interrelated by one or more Boolean operations.

22. The article of claim 15, wherein the plurality of algebraic expressions to comprise one or more basis expressions.

23. The article of claim 15, wherein the complex tree hierarchy to comprise an ordered tree hierarchy.

24. The article of claim 15, wherein the instructions executable to compare the another complex tree expression for the rooted partial subtree query with the reduced plurality of interrelated portions for the complex tree expression comprise instructions executable to identify at least one partial match, at least one match, or a combination thereof.

25. The article of claim 24, wherein the non-transitory storage medium further comprises instructions executable to: generate one or more matching portions from the reduced plurality of interrelated portions.

26. The article of claim 24, wherein the non-transitory storage medium further comprises instructions executable to: generate a Boolean true or false responsive to an identification of a match or a partial match between the another complex tree expression for the rooted partial subtree query and the reduced plurality of interrelated portions for the complex tree expression.

27. The article of claim 15, wherein the non-transitory storage medium further comprises instructions executable to: use, at least in part, one or more algebraic expressions on at least one of the plurality of interrelated portions to manipulate the complex tree hierarchy.

28. The article of claim 27, wherein the non-transitory storage medium further comprises executable instructions to manipulate the complex tree hierarchy so as to merge the at least one of the plurality of interrelated portions with a portion of a second complex tree hierarchy.

29. An apparatus comprising:
means for forming a complex tree expression for a complex tree hierarchy using at least in part a plurality of operations usable for determining a one-to-one association between tree hierarchies and natural numerals;
means for forming another complex tree expression for a rooted partial subtree query using, at least in part, the plurality of operations usable for determining the one-to-one association between tree hierarchies and natural numerals;
means for reducing, using at least in part a plurality of algebraic expressions, the formed complex tree expression for the complex tree hierarchy into a plurality of interrelated portions; and
means for comparing the another complex tree expression for the rooted partial subtree query with the reduced plurality of interrelated portions for the complex tree expression.

30. The apparatus of claim 29, wherein the plurality of operations comprise at least one of an inversion operation or a merger operation.

31. The apparatus of claim 29, wherein the plurality of operations comprise at least one of a zero-push or a one-push operation.

32. The apparatus of claim 31, wherein the means for forming the tree expression using at least in part the zero-push operation comprises, at least in part, means for adding a child node and an edge to a parent node and labeling the added edge with a binary zero.

33. The apparatus of claim 31, wherein the means for forming the tree expression using at least in part the one-push operation comprises, at least in part, means for adding a child node and an edge to a parent node and labeling the added edge with a binary one.

34. The apparatus of claim 29, wherein the plurality of interrelated portions comprise one or more queries.

35. The apparatus of claim 34, wherein the one or more queries are interrelated by one or more Boolean operations.

36. The apparatus of claim 29, wherein the plurality of algebraic expressions comprise one or more basis expressions.

37. The apparatus of claim 29, wherein the complex tree hierarchy comprises an ordered tree hierarchy.

38. The apparatus of claim 29 further comprising means for identifying at least one partial match, at least one match, or a combination thereof based, at least in part, on the comparison of the another complex tree expression for the rooted partial subtree query with the reduced plurality of interrelated portions for the complex tree expression.

39. The apparatus of claim 38 further comprising means for generating one or more matching portions from the reduced plurality of interrelated portions.

40. The apparatus of claim 38 further comprising means for generating a Boolean true or false responsive to an identification of a match or a partial match between the another complex tree expression for the rooted partial subtree query and the reduced plurality of interrelated portions for the complex tree expression.

41. The apparatus of claim 29, wherein the means for reducing the formed tree expression further comprises means for using, at least in part, one or more algebraic expressions on at least one of the plurality of interrelated portions to manipulate the complex tree hierarchy.

42. The apparatus of claim 41, wherein the means for using, at least in part, one or more algebraic expressions to manipulate the complex hierarchy comprises means for merging the at least one of the plurality of interrelated portions with a portion of a second complex tree hierarchy.

43. An apparatus comprising:
a computing device comprising one or more processors programmed with instructions executable to:
form a complex tree expression for a complex tree hierarchy via use at least in part of a plurality of operations to determine a one-to-one association between tree hierarchies and natural numerals;
form another complex tree expression for a rooted partial subtree query using, at least in part, the plurality of operations usable to determine the one-to-one association between tree hierarchies and natural numerals;
reduce, via use at least in part of a plurality of algebraic expressions, the formed complex tree expression for the complex tree hierarchy into a plurality of interrelated portions; and
compare the another complex tree expression for the rooted partial subtree query with the reduced plurality of interrelated portions for the complex tree expression.

44. The apparatus of claim 43, wherein the plurality of operations to comprise at least one of an inversion operation or a merger operation.

45. The apparatus of claim 43, wherein the plurality of operations to comprise at least one of a zero-push or a one-push operation.

46. The apparatus of claim 45, wherein the zero-push operation to comprise, at least in part, addition of a child node and an edge to a parent node and addition of a binary zero label to the edge.

47. The apparatus of claim 45, wherein the one-push operation to comprise, at least in part, addition of a child node and an edge to a parent node and addition of a binary one label to the edge.

48. The apparatus of claim 43, wherein the plurality of interrelated portions to comprise one or more queries.

49. The apparatus of claim 48, wherein the one or more queries are to be interrelated by one or more Boolean operations.

50. The apparatus of claim 43, wherein the plurality of algebraic expressions to comprise one or more basis expressions.

51. The apparatus of claim 43, wherein the complex tree hierarchy to comprise an ordered tree hierarchy.

52. The apparatus of claim 43, wherein the one or more processors programmed with instructions executable to compare the another complex tree expression for the rooted partial subtree query with the reduced plurality of interrelated portions for the complex tree expression comprise instructions executable to identify at least one partial match, at least one match, or a combination thereof.

53. The apparatus of claim 52, wherein the one or more processors are further programmed with instructions executable to: generate one or more matching portions from the reduced plurality of interrelated portions.

54. The apparatus of claim 52, wherein the one or more processors are further programmed with instructions executable to: generate a Boolean true or false responsive to an identification of a match or a partial match between the another complex tree expression for the rooted partial subtree query and the reduced plurality of interrelated portions for the complex tree expression.

55. The apparatus of claim 43, wherein the one or more processors are further programmed with instructions executable to: use, at least in part, one or more algebraic expressions on at least one of the plurality of interrelated portions to manipulate the complex tree hierarchy.

56. The apparatus of claim 55, wherein the one or more processors are further programmed with instructions executable to merge the at least one of the plurality of interrelated portions with a portion of a second complex tree hierarchy.

* * * * *